(12) United States Patent
Anzawa et al.

(10) Patent No.: US 7,486,969 B2
(45) Date of Patent: Feb. 3, 2009

(54) TRANSMITTING PORTABLE TERMINAL

(75) Inventors: Kazuya Anzawa, Yokohama (JP);
Yasutaka Urakawa, Yokohama (JP);
Kenji Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 652 days.

(21) Appl. No.: 10/850,098

(22) Filed: May 20, 2004

(65) Prior Publication Data
US 2004/0235531 A1 Nov. 25, 2004

(30) Foreign Application Priority Data
May 20, 2003 (JP) .......................... P2003-142292

(51) Int. Cl.
*H04M 1/00* (2006.01)

(52) U.S. Cl. ................. 455/563; 348/14.01; 348/14.02; 348/14.1; 381/306

(58) Field of Classification Search ............. 455/414.3, 455/550.1, 563; 348/14.01, 14.02, 14.08–14.1; 340/5.82–5.84; 381/306, 333, 388; 704/205
See application file for complete search history.

(56) References Cited

U.S. PATENT DOCUMENTS

2002/0198017 A1 * 12/2002 Babasaki et al. ............ 455/550
2003/0117485 A1 * 6/2003 Mochizuki et al. ........ 348/14.01
2004/0114731 A1 * 6/2004 Gillett et al. ............. 379/88.03

FOREIGN PATENT DOCUMENTS

| CN | 1427626 | 7/2003 |
|---|---|---|
| EP | 1 326 445 A2 | 7/2003 |
| JP | 02-215891 | 9/1991 |
| JP | 05-012023 | 1/1993 |
| JP | 05-041894 | 2/1993 |
| JP | 08-305878 | 11/1996 |
| JP | 2000-512039 | 9/2000 |

(Continued)

OTHER PUBLICATIONS

Chinese Office Action issued on Jun. 9, 2006.

(Continued)

*Primary Examiner*—MD Shafiul Alam Elahee
(74) *Attorney, Agent, or Firm*—Brinks Hofer Gilson & Lione

(57) ABSTRACT

A transmitting cell phone 10 according to the present invention is provided with a character image DB 11, a user designator 12, a character image generator 13, and a communicator 17. A plurality of character images are preliminarily stored in the character image DB 11. The user designator 12 designates an expression or movement of a character image to be transmitted to a receiving cell phone 20. The character image generator 13 acquires one character image out of the plurality of character images stored in the character image DB 11 and uses the character image to generate a character image with the expression or movement designated by the user designator 12. The communicator 17 transmits the generated character image to the receiving cell phone 20.

15 Claims, 18 Drawing Sheets

391

| VOLUME \ FREQUENCY | LEVEL5 | LEVEL4 | LEVEL3 | LEVEL2 | LEVEL1 |
|---|---|---|---|---|---|
| 5 | ANGER (HIGH) | LAUGH (HIGH) | MARVEL (HIGH) | DISLIKE (HIGH) | CRY (HIGH) |
| 4 | ANGER(MIDDLE) | LAUGH(MIDDLE) | MARVEL(MIDDLE) | DISLIKE(MIDDLE) | CRY(MIDDLE) |
| 3 | ANGER(LOW) | LAUGH(LOW) | MARVEL(LOW) | DISLIKE(LOW) | CRY(LOW) |
| 2 | LAUGH (HIGH) | MARVEL (HIGH) | NORMAL EXPRESSION | CRY (HIGH) | SORROW (HIGH) |
| 1 | LAUGH(MIDDLE) | MARVEL(MIDDLE) | NORMAL EXPRESSION | CRY(MIDDLE) | SORROW(MIDDLE) |

FOREIGN PATENT DOCUMENTS

| | | |
|---|---|---|
| JP | 2002-009963 A | 1/2002 |
| JP | 2002-176632 A | 6/2002 |
| JP | 2002-185632 | 6/2002 |
| JP | 2002-354436 | 12/2002 |
| WO | WO 97/35280 | 9/1997 |
| WO | WO 03/010986 A1 | 2/2003 |
| WO | WO 03/021924 A1 | 3/2003 |

OTHER PUBLICATIONS

Patent Abstracts of Japan, "Communicaton System Device and Communication System", JP2002-009963, Jan. 11, 2002, 1 Page.

Japanese Office Action w/ English translation dated Jun. 24, 2008.

Office Action dated Nov. 18, 2008, in Japanese Patent Application No. P2003-142292, with English language translation (4 pages).

* cited by examiner

Fig.6
(a)
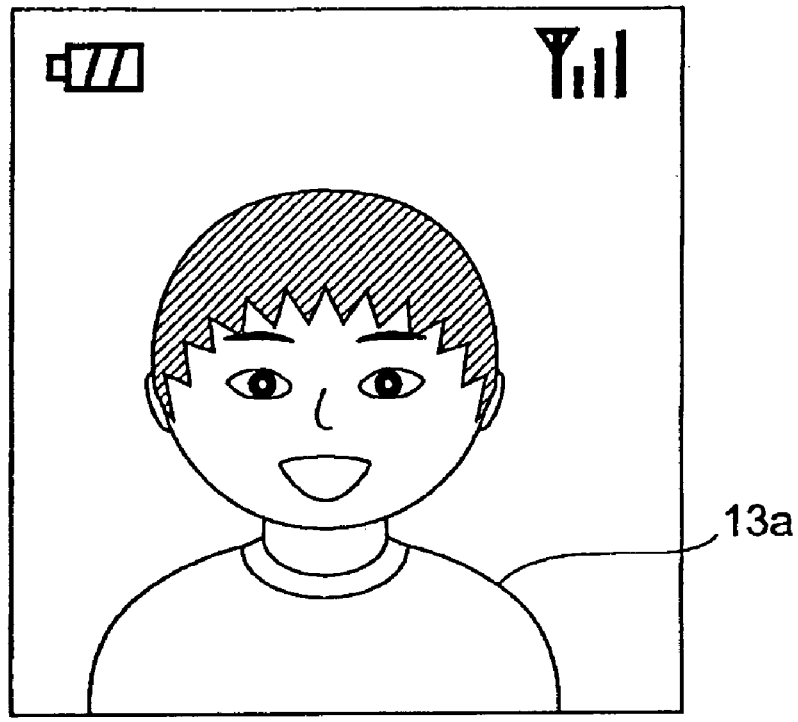
(b)

| FREQUENCY / VOLUME | LEVEL5 | LEVEL4 | LEVEL3 | LEVEL2 | LEVEL1 |
|---|---|---|---|---|---|
| 5 | ANGER (HIGH) | LAUGH (HIGH) | MARVEL (HIGH) | DISLIKE (HIGH) | CRY (HIGH) |
| 4 | ANGER(MIDDLE) | LAUGH(MIDDLE) | MARVEL(MIDDLE) | DISLIKE(MIDDLE) | CRY(MIDDLE) |
| 3 | ANGER(LOW) | LAUGH(LOW) | MARVEL(LOW) | DISLIKE(LOW) | CRY(LOW) |
| 2 | LAUGH (HIGH) | MARVEL (HIGH) | NORMAL EXPRESSION | CRY (HIGH) | SORROW (HIGH) |
| 1 | LAUGH(MIDDLE) | MARVEL(MIDDLE) | NORMAL EXPRESSION | CRY(MIDDLE) | SORROW(MIDDLE) |

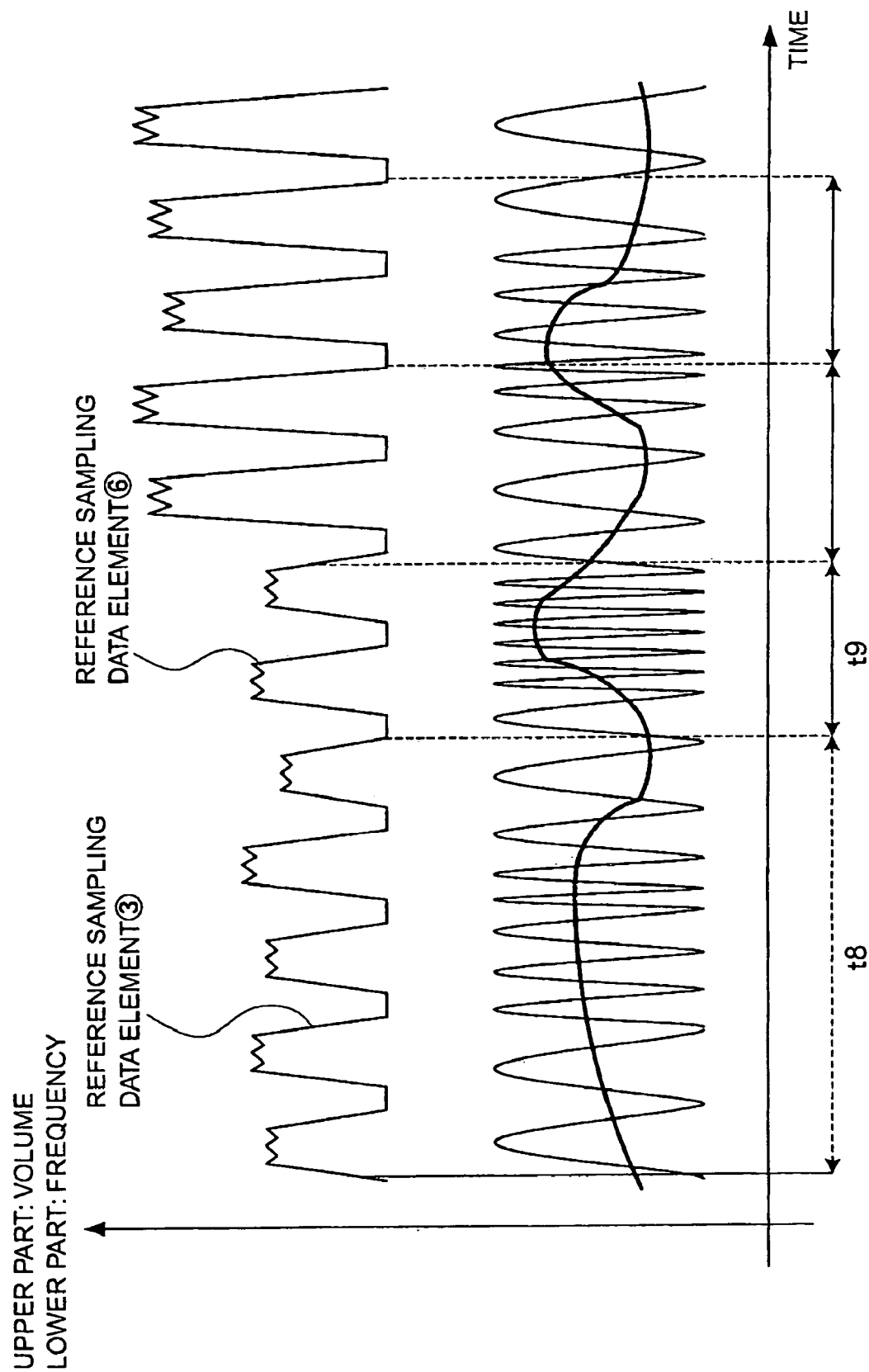

| VOLUME \ FREQUENCY | < REFERENCE VALUE - D | BETWEEN REFERENCE VALUE - D AND REFERENCE VALUE + C | REFERENCE VALUE + C ≤ |
|---|---|---|---|
| < REFERENCE VALUE - THRESHOLD | COOL EMOTION I | COOL EMOTION II | PUZZLED EMOTION I |
| BETWEEN REFERENCE VALUE - THRESHOLD AND REFERENCE VALUE + THRESHOLD | COOL EMOTION III | NORMAL EMOTION | HOT EMOTION II |
| REFERENCE VALUE + THRESHOLD ≤ | PUZZLED EMOTION II | HOT EMOTION III | HOT EMOTION I |

| EMOTION TYPE | EXPRESSION |
|---|---|
| NORMAL EMOTION | SMILING EXPRESSION |
| COOL EMOTION I | QUITE TIRED |
| COOL EMOTION II | A LITTLE TIRED |
| COOL EMOTION III | NO EXPRESSION |
| PUZZLED EMOTION I | DEPRESSED EXPRESSION |
| PUZZLED EMOTION II | PUZZLED EXPRESSION |
| HOT EMOTION I | ANGRILY EXCITED EXPRESSION |
| HOT EMOTION II | IMPATIENT EXPRESSION |
| HOT EMOTION III | HAPPY EXPRESSION |

TRANSMITTING PORTABLE TERMINAL

BACKGROUND OF THE INVENTION

1. Field of the Invention

The present invention relates to a portable terminal, an image communication program, and an image communication method.

2. Related Background Art

Cell phones with videotelephony have already been put to practical use with increasing speed of wireless communications and with development of image compression technology. A cell phone of this type transmits a moving picture of an originator taken by a built-in camera, in real time to a cell phone of a recipient, and the cell phone of the recipient receives this moving picture to reproduce it sequentially. This permits the originator and recipient to carry on a telephone conversation while watching an image of each other's face.

The cell phones with videotelephony also include proposed ones with a function of transmitting image data made by likening the originator's face to a predetermined character (hereinafter referred to as a "character image"), in place of the actually taken originator's face image. For example, Japanese Patent Laid-Open No. 2002-009963 discloses a videotelephone configured to generate a character image based on a voice entered into a cell phone and to transmit it to a recipient's cell phone. Japanese Patent Laid-Open No. 2002-176632 discloses a cell phone configured to also change a character image according to changes of expressions on the originator's face and to transmit the changing character image to a recipient's cell phone.

SUMMARY OF THE INVENTION

However, the above conventional techniques both are those in which the cell phone generates the character image, based on the voice itself generated by the originator or based on expressions on the face, and the images generated thereby do not always reflect originator's personal emotion or will. For this reason, it is not necessarily the case that the generated character image is one matched with originator's desire. Particularly, in the invention described in Japanese Patent Application Laid-Open No. 2002-009963, the generated character image is not one with consideration to the tone (sound volume or frequency) of the voice of the originator and the expressions on the character image sometimes fail to adequately reflect the originator's emotion. In the invention described in Japanese Patent Application Laid-Open No. 2002-176632, a process of analyzing the originator's face image is required as an extra process for reflecting the originator's emotion or will in the character image.

An object of the present invention is therefore to provide a portable terminal in a relatively simple configuration to generate a character image close to an originator's desire and transmit it to a recipient's portable terminal, thereby enhancing seasoning effect in a telephone conversation between originator and recipient.

In order to achieve the above object, a transmitting portable terminal according to the present invention comprises: storage means storing a plurality of character images; designating means for designating an expression or movement of a character image to be transmitted to a receiving portable terminal; generating means for acquiring a character image out of the plurality of character images stored in the storage means and for using the acquired character image to generate a character image with the expression or movement designated by the designating means; and transmitting means for transmitting the character image generated by the generating means, to the receiving portable terminal.

An image communication program according to the present invention lets a transmitting portable terminal execute: a designating process of designating an expression or movement of a character image to be transmitted to a receiving portable terminal; a generating process of acquiring a character image out of a plurality of character images stored in storage means and using the acquired character image to generate a character image with the expression or movement designated by the designating process; and a transmitting process of transmitting the character image generated by the generating process, to the receiving portable terminal.

Furthermore, an image communication method according to the present invention comprises: a designating step wherein a transmitting portable terminal designates an expression or movement of a character image to be transmitted to a receiving portable terminal; a generating step wherein the transmitting portable terminal acquires a character image out of a plurality of character images stored in storage means and uses the acquired character image to generate a character image with the expression or movement designated in the designating step; and a transmitting step wherein the transmitting portable terminal transmits the character image generated in the generating step, to the receiving portable terminal.

According to these aspects of the invention, the transmitting portable terminal is configured to use a character image acquired out of a plurality of character images to generate a character image with a designated expression or movement (e.g., a drawn picture), and to transmit it to the receiving portable terminal. Namely, the expression or movement of the character image to be transmitted to the receiving portable terminal is one reflecting the emotion or will of an originator being a user of the transmitting portable terminal, whereby it becomes feasible to generate and transmit/receive the character image close to originator's desire, by the relatively simple configuration. As a result, the seasoning effect is enhanced in a telephone conversation between the originator and recipient.

Another transmitting portable terminal according to the present invention comprises: storage means storing a plurality of character images; input means for entering a voice; determining means for analyzing a tone of the voice entered by the input means and for determining an expression or movement of a character image to be transmitted to a receiving portable terminal, based on a result of the analysis of the tone; generating means for acquiring a character image out of the plurality of character images stored in the storage means and for using the acquired character image to generate a character image with the expression or movement determined by the determining means; and transmitting means for transmitting the character image generated by the generating means, to the receiving portable terminal.

Another image communication program according to the present invention lets a transmitting portable terminal execute: an input process of entering a voice; a determining process of analyzing a tone of the voice entered by the input process and determining an expression or movement of a character image to be transmitted to a receiving portable terminal, based on a result of the analysis of the tone; a generating process of acquiring a character image out of a plurality of character images stored in storage means and using the acquired character image to generate a character image with the expression or movement determined by the determining process; and a transmitting process of transmitting the character image generated by the generating process, to the receiving portable terminal.

Another image communication method according to the present invention comprises: an input step wherein a transmitting portable terminal enters a voice; a determining step wherein the transmitting portable terminal analyzes a tone of the voice entered in the input step and determines an expression or movement of a character image to be transmitted to a receiving portable terminal, based on a result of the analysis of the tone; a generating step wherein the transmitting portable terminal acquires a character image out of a plurality of character images stored in storage means and uses the acquired character image to generate a character image with the expression or movement determined in the determining step; and a transmitting step wherein the transmitting portable terminal transmits the character image generated in the generating step, to the receiving portable terminal.

According to these aspects of the invention, the transmitting portable terminal is configured to use a character image acquired out of a plurality of character images to generate a character image with an expression or movement determined based on the result of the analysis of the tone of the input voice, and to transmit it to the receiving portable terminal. Namely, the expression or movement of the character image to be transmitted to the receiving portable terminal is one reflecting the tone of the voice of an originator being a user of the transmitting portable terminal. The tone properly reflects the emotion of the originator. Accordingly, by the relatively simple configuration without need for a process of analyzing an originator's face image, it becomes feasible to generate and transmit/receive the character image close to originator's desire. As a result, the seasoning effect is enhanced in a telephone conversation between the originator and recipient.

In the transmitting portable terminal according to the present invention, preferably, the generating means makes display means of the transmitting portable terminal display the character image generated by the generating means.

According to the present invention, the character image generated in the transmitting portable terminal is displayed not only on the receiving portable terminal, but also on the display means of the transmitting portable terminal. Therefore, the originator can make a telephone conversation while readily and promptly capturing what character image is viewed in the telephone conversation by the recipient. A pointer to indicate a location on a screen may also be displayed over the character image displayed on the transmitting portable terminal side, which enables an additional function to be added, e.g., a function of changing an orientation of the character image according to motion of the pointer, or a function of selecting a part of the character image.

In the transmitting portable terminal according to the present invention, preferably, the determining means determines the expression or movement of the character image to be transmitted to the receiving portable terminal, based on a voice transmitted from the receiving portable terminal.

According to the present invention, the expression or movement of the character image to be transmitted to the receiving portable terminal is determined based on the voice of the recipient transmitted from the receiving portable terminal. This permits the recipient also to actively change the expression or movement of the character image, which enhances the seasoning effect and amusement nature more. Here the voice of the recipient may be a sound tone thereof and, in this case, the expression or movement of the character image is determined based on a result of an analysis of the tone of the recipient's voice by the determining means. It is needless to mention in this case that the transmitting portable terminal can also determine the expression or movement of the character image to be transmitted to the receiving portable terminal, based on the tone analysis result of the originator's voice entered into the transmitting portable terminal. Furthermore, the expression or movement of the character image can also be determined based on both the tone analysis result of the originator's voice entered into the transmitting portable terminal and the tone analysis result of the recipient's voice.

In the transmitting portable terminal according to the present invention, preferably, the determining means analyzes at least one of a sound volume and a frequency of the voice, as the tone.

According to the present invention, the transmitting portable terminal is configured to use a character image acquired out of a plurality of character images to generate a character image with an expression or movement determined based on at least one of the sound volume (including the presence/absence of voice.) and the frequency of the input voice. The generated character image is transmitted to the receiving portable terminal. The sound volume of the input voice is likely to reflect the emotion of the originator being the user of the transmitting portable terminal. According to this emotion, the transmitting portable terminal alters the expression or movement of the character image generated and transmitted.

For example, where a difference between a current sound volume of the originator and a normal sound volume is less than a predetermined value, the transmitting portable terminal determines that the originator's emotion is in a usual state, and generates and transmits a character image indicating the normal emotion. On the other hand, where the difference between the current sound volume of the originator and the normal sound volume is not less than the predetermined value and where the current sound volume of the originator is not less than the normal sound volume, the transmitting portable terminal determines that the originator's emotion is in a more excited state than the usual state, and generates and transmits a character image indicating a hot feeling. Furthermore, where the difference between the current sound volume of the originator and the normal sound volume is not less than the predetermined value and where the current sound volume of the originator is less than the normal sound volume, the transmitting portable terminal determines that the originator's emotion is in a calmer state than the normal state, and generates and transmits a character image indicating a cool feeling. In this manner, the transmitting portable terminal is able to estimate the current emotion of the originator from the sound volume of the input voice to some extent and to properly change the expression or movement of the character image presented to the communication partner, according to the result of the estimation, which further enhances the seasoning effect in the telephone conversation.

Besides the sound volume, the frequency may also be used as an index to determine the expression or movement of the character image. Namely, where a current frequency of the originator is less than a value resulting from addition of a predetermined value to a normal frequency, the transmitting portable terminal determines that the originator's emotion is in the usual state, and generates and transmits the character image indicating the normal feeling. On the other hand, where the current frequency of the originator is not less than the value resulting from the addition of the predetermined value to the normal frequency and is not less than a value resulting from subtraction of another predetermined value from the normal frequency, the transmitting portable terminal determines that the originator's emotion is in a more excited state than the usual state, and generates and transmits a character image indicating a hot feeling. Furthermore, where the current frequency of the originator is not less than the value resulting from the addition of the predetermined value to the normal frequency and is less than the value resulting from the subtraction of the other predetermined value from the normal frequency, the transmitting portable terminal determines that the originator's emotion is in a calmer state than the usual state, and generates and transmits a character image indicating a cool feeling.

The expression or movement of the character image may also be determined by combination of the sound volume with frequency.

In the transmitting portable terminal, more preferably, the transmitting means transmits the character image, using a standard video transmission protocol.

In the image communication program, more preferably, the transmitting process is to transmit the character image, using a standard video transmission protocol.

In the image communication method, more preferably, the transmitting step is a step wherein the transmitting portable terminal transmits the character image, using a standard video transmission protocol.

The standard video transmission protocol is, for example, one of H.320, H.324, 3G324M, and so on. By using the standard existing communication protocols in the transmission of the character image in this manner, the object of the present invention can be achieved without need for developing a new image transmission technology.

It is also feasible to construct an image communication system comprising the aforementioned transmitting portable terminal and receiving portable terminal and configured so that the transmitting portable terminal transmits the character image generated, to the receiving portable terminal.

The present invention enables a portable terminal in a relatively simple configuration to generate a character image close to originator's desire and to transmit the character image to a recipient's portable terminal, thereby enhancing the seasoning effect in a telephone conversation between the originator and the recipient.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6A is an illustration showing an example of a character image before designation of an expression, and FIG. 6B an illustration showing an example of a character image after designation of a snoozing face as an expression.

FIG. 16 is an illustration showing a reference sampling data element and a target sampling data element extracted from a tone analysis result, in selection of a composite analysis mode in the second embodiment.

FIG. 17 is an illustration showing an example of an emotion type table referred to in selection of the composite analysis mode in the second embodiment.

FIG. 18 is an illustration showing an example of an expression table referred to in selection of the composite analysis mode in the second embodiment.

DESCRIPTION OF THE PREFERRED EMBODIMENTS

First Embodiment

Figure 1:
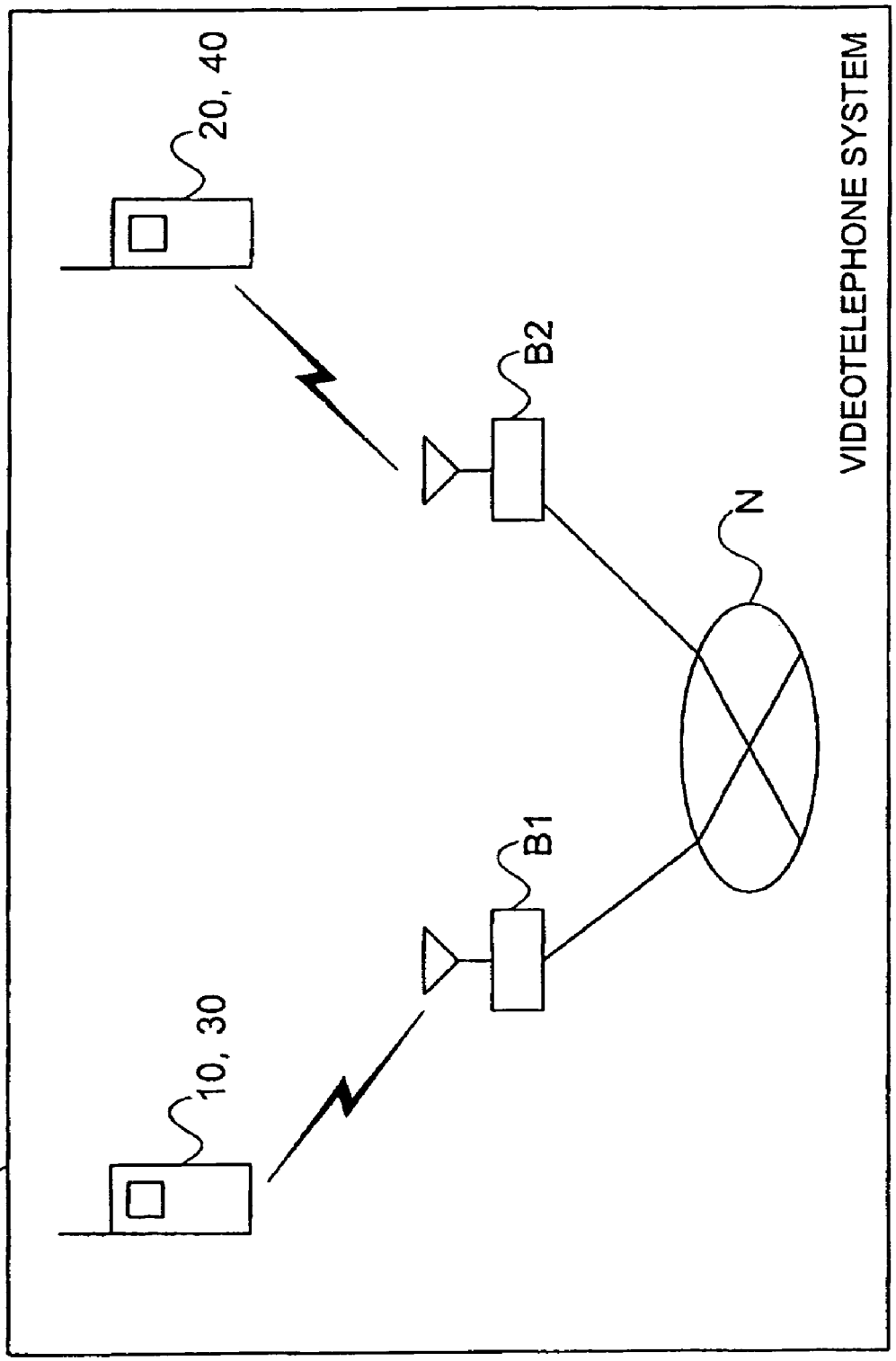
FIG. 1 is an illustration conceptually showing an entire configuration of a videotelephone system according to the present invention.

A videotelephone system (corresponding to an image communication system) in the first embodiment of the present invention will be described below with reference to the accompanying drawings. First, a configuration will be described. FIG. 1 is an illustration showing the entire configuration of video telephone system 1 for implementing a telephone conversation with images between an originator and a recipient. The images transmitted and received in the present system are not actually taken images of the originator or recipient, but are image data (character images) generated by likening the originator or recipient to a predetermined character as substitute therefor.

As shown in FIG. 1, a cell phone 10 of the originator (corresponding to a transmitting portable terminal) is wirelessly coupled through base station B1 to a communication network N, and a cell phone 20 of the recipient (corresponding to a receiving portable terminal) is wirelessly coupled through base station B2 to the communication network N. This enables the cell phone 10 and cell phone 20 to perform bidirectional transmission/reception of various data containing the character image.

Next, a functional configuration of the cell phone 10 will be described with reference to FIG. 2.

Figure 2:
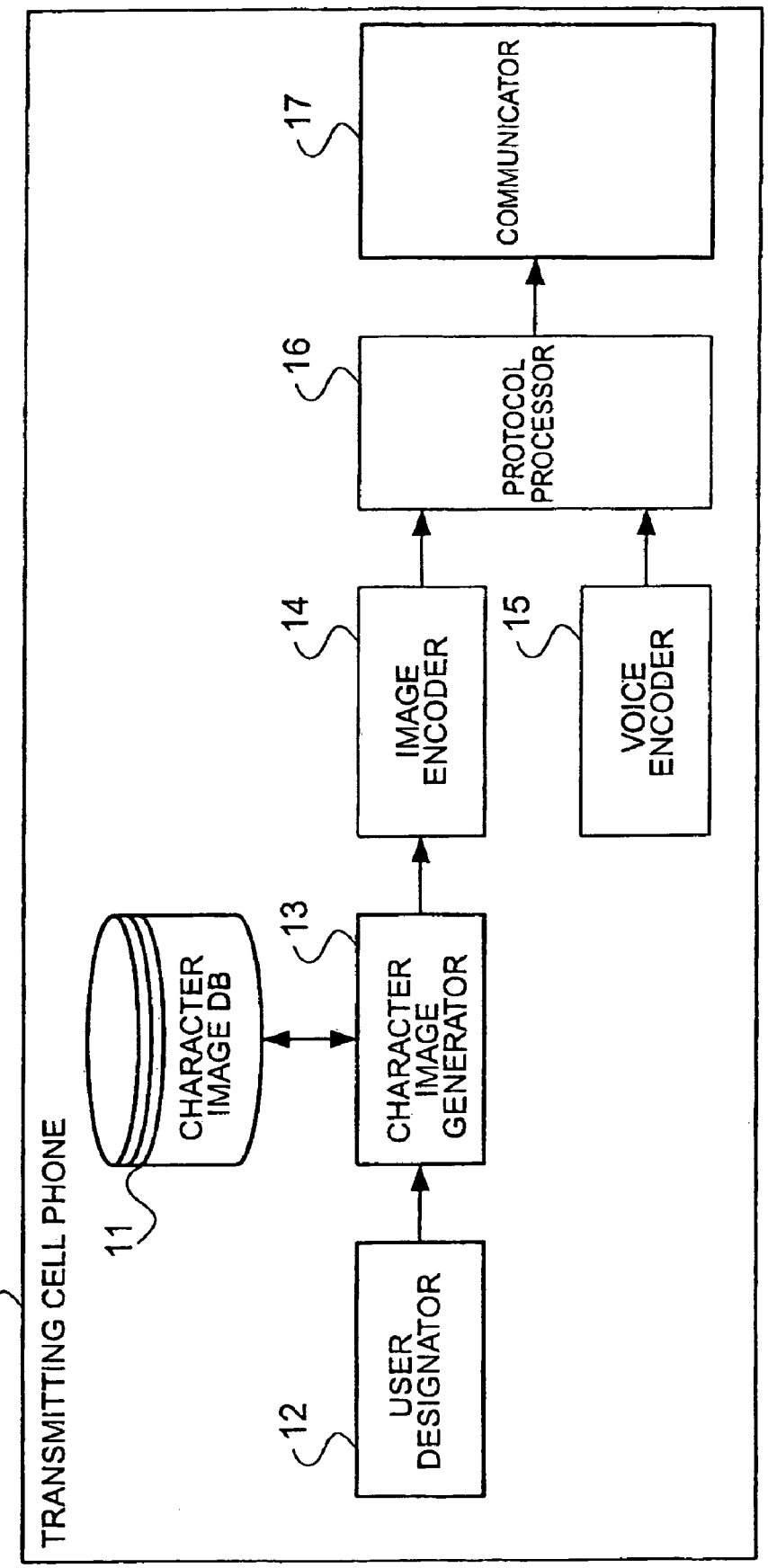
FIG. 2 is an illustration showing a functional configuration of a transmitting cell phone in the first embodiment.

As shown in FIG. 2, the cell phone 10 is functionally composed of a character image DB 11 (corresponding to the storage means), a user designator 12 (corresponding to the designating means), a character image generator 13 (corresponding to the generating means), an image encoder 14, a voice encoder 15, a protocol processor 16, and a communicator 17 (corresponding to the transmitting means).

A plurality of character images as objects for selection by the user designator 12 are preliminarily stored (registered) in the character image DB 11. The plurality of character images are registered, for example, according to genders and ages and also according to differences in hairstyle, clothes, etc. so as to be adaptable for a variety of characteristics of the originator. These character images can be acquired by downloads through the Internet, by short-range wireless communication such as infrared communication, or by e-mail. The data format of the character images can be any format, e.g., still image base or 3D (Dimension) base static data formats, an application format using designation and input of an expression or movement and an output interface to the image encoder 14, and so on.

The character images stored in the character image DB 11 may be arranged to be dynamically altered according to seasons and date and time in synchronism with the calendar and clock. For example, in a case where background images are also stored together with the character images, a background image in summer is an image of a bathing beach, and a background image after twenty is a night view image. It is also possible to adopt such changes of character images that a character image in early morning has an unpainted face (without makeup), a character image in the night is one in pajamas, and a character image at Christmas is one in Santa Claus clothes.

The user designator 12 selects one character image out of the plurality of character images stored in the character image DB 11, as a character image before a change of expression or before a movement (in other words, as a base character image). The character image may be selected based on an input operation by the user of the cell phone 10, or may be automatically selected corresponding to the communication partner (cell phone 20) out of character images preliminarily associated with groups and individuals registered in the telephone book.

The user designator 12 designates at least one of expressions and movements of the selected character image, based on an input operation by the user of the cell phone 10. The designation content is outputted to the character image generator 13. For example, in a case where the upward, downward, leftward, and rightward cursor keys are assigned expressions of "smile," "cry," and "anger," and a movement of "bow," respectively, one depression of the upward key designates a character image with an expression of smile, and one depression of the rightward key designates a character image with a movement of bow. It is also possible to add another function of assigning each expression a degree thereof; for example, when the upward key is further depressed after a depression of the upward key, a character image with a higher degree of the smile expression is designated according to the number of depressions.

The designation contents (definition contents) assigned to the keys may be, for example, not only individual displays such as a display of the right eye closed, a display of the entire body of the character, a display of the upper body only, etc., but also composite displays, such as a composite display of operations of the mouth and eyes to generate a smiling face, a display of varying action of the mouth to generate mouth forms pronouncing "a, i, u, e, and o," and so on. Furthermore, scripts may be used to add sequential processing, repetitive processing, queueing, conditions, etc. to the individual designation contents, thereby giving each character image a variety of movements.

In a case where the character image is also displayed on the screen of the cell phone 10, the user designator 12 may be configured so that the user can thereby optionally move a pointer displayed on the screen of the cell phone 10. This permits the user to change the orientation of the face of the character image, to designate a portion of the character image, or to pat the character image on the head. For example, where clothes are designated as a portion of the character image, it becomes feasible to change clothes; where a pat is given on the head of the character image, it also becomes feasible to change the expression to a smiling expression.

It is also contemplated that, where the character images with the aforementioned respective expressions or movements are preliminarily stored in the character image DB 11, the user designator 12 is arranged to select one character image out of these character images displayed in a list, based on an input operation by the user of the cell phone 10.

The input operation by the user of the cell phone 10 embraces not only input by finger, but also voice recognition, and voice input utilizing word registration.

The character image generator 13 acquires the character image selected by the user designator 12, from the character image DB 11 and generates a character image with an expression or movement designated by the user designator 12, using the character image.

The character image generator 13 does not always have to perform the generation of the character image pending the designation from the user designator 12. Namely, where no designation from the user designator 12 is detected for a fixed period, the character image generator 13 may generate a character image with an expression or movement preliminarily registered in the cell phone 10 or registered in advance by the user. For example, where there is no such designation after a lapse of three minutes, the character image indicates a sleepy gesture of a yawn or the like, or an impatient gesture; where there is no designation even after a lapse of further three minutes, the character image falls asleep, thereby enhancing the seasoning effect. Such expressions or movements can be set to differ among types of character images.

In order to present likeness to a human, the character image generator 13 may be provided with a function of automatically giving the character image blinks or delicate facial movements. Namely, standard movements and nonstandard movements are defined as movements of the character image, and the character image generator 13 is provided with an additional function of providing the character image with one of such movements as dozing, taking a mirror and laying a hand on hair, checking mail of the cell phone, and so on as the nonstandard movements. In this case, in order to add unpredictability, it is preferable that even the same character image display different movements. Conversely, it is also possible to add a doll mode in which the character image does not have likeness to a human.

The image encoder 14 encodes and compresses the character image generated by the character image generator 13.

The voice encoder 15 encodes and compresses the input originator's voice.

The protocol processor 16 converts the character image encoded by the image encoder 14 and the voice encoded by the voice encoder 15, into signals that can be received by the cell phone 20, using a standard video telephone protocol (e.g., 3G-324M).

The communicator 17 actually transmits the signals of the character image and voice converted by the protocol processor 16, to the address of the cell phone 20.

Figure 3:
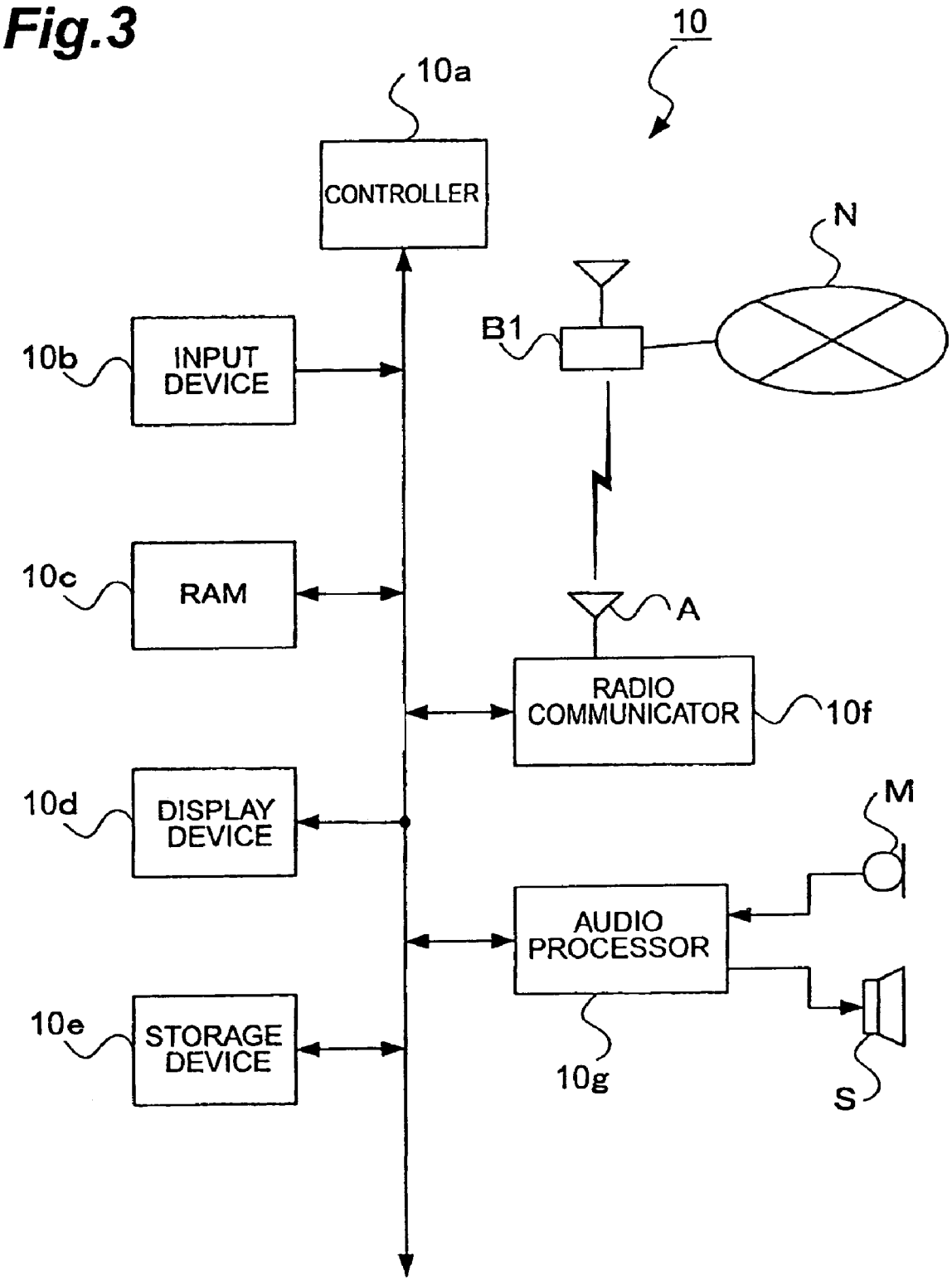
FIG. 3 is a block diagram showing a hardware configuration of a transmitting cell phone according to the present invention.

Subsequently, a hardware configuration of the cell phone 10, and a correspondence between the hardware configuration and the functional configuration will be described with reference to FIG. 3. FIG. 3 is a block diagram showing the hardware configuration of cell phone 10. As shown in FIG. 3, the cell phone 10 is physically composed of a control unit 10a, an input device 10b, a RAM 10c, a display device 10d, a storage device 10e, a radio communication device 10f, and an audio processor 10g. These devices are electrically coupled each through a bus so as to be able to receive and feed various signals from and to each other.

More specifically, the control unit 10a is, for example, a CPU (Central Processing unit); the input device 10b, for example, cursor keys and numeral input keys; and the RAM 10c a volatile semiconductor memory. The display device 10d is, for example, an LCD (Liquid Crystal Display) or an EL (Electro Luminescence) display, and the storage device 10e, for example, a nonvolatile semiconductor memory such as a flash memory. The radio communication device 10f includes, for example, RF (Radio Frequency), baseband part, and videotelephone protocol processors. The audio processor 10g includes a microphone M, a speaker S, a device of analyzing the sound tone of input voice, and a voice recognition device.

The function of the character image DB 11 is substantialized by the storage device 10e as a physical component, and the function of the user designator 12 by the input device 10b. The function of the character image generator 13 is substantialized when the control unit 10a executes a predetermined program. The functions of the image encoder 14, the protocol processor 16, and the communicator 17 are substantialized by the radio communication device 10f, and the function of the voice encoder 15 by the audio processor 10g.

Figure 4:
FIG. 4 is an illustration showing an example of correspondence between numbers of depressed keys and expressions or movements of a character image in the first embodiment.

Next, the operation of the videotelephone system 1 in the present embodiment will be described, while also describing an image communication method according to the present invention. In the description of the present operation, as shown in FIG. 4, an example adopted is a case where five types of expressions or movements are assigned to the respective number keys, for simplicity. Namely, the key number "1" is assigned an "expression of opening both eyes," the key number "2" an "expression of a little opening mouth," the key number "3" an "expression of closing mouth," the key number "4" an "expression of closing both eyes (falling asleep)," and the key number "5" an "expression of bending the body forward (bowing)."

Figure 5:
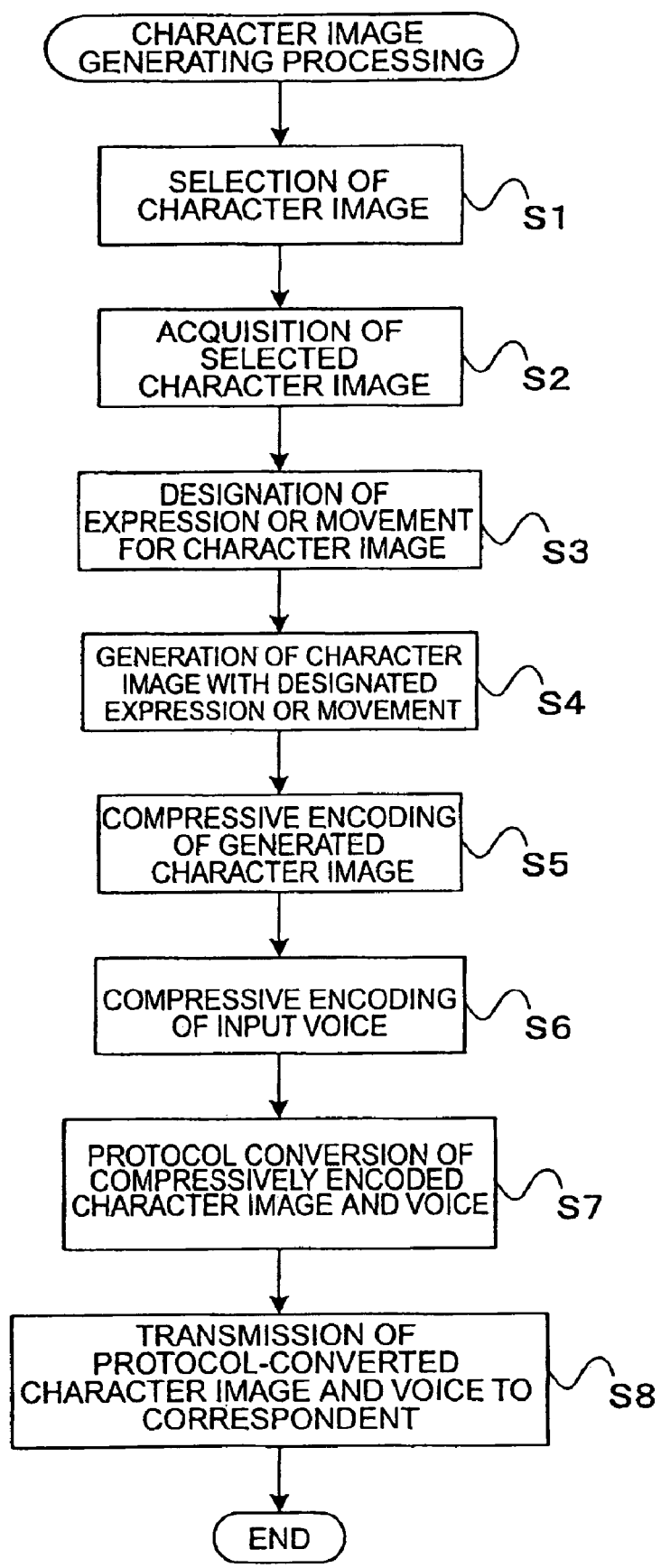
FIG. 5 is a flowchart for explaining a character image generating processing executed by the transmitting cell phone in the first embodiment.

FIG. 5 is a flowchart showing the flow of character image generating processing executed by the videotelephone system 1. First, the user of cell phone 10 selects one character image by the user designator 12 (S1), and then the character image generator 13 is notified of the selected character image The character image generator 13, receiving the notification, acquires the selected character image as a base character image from the character image DB 11 (S2).

Subsequently, the user of cell phone 10 designates a desired expression or movement for the character image acquired at S2, by the user designator 12 (S3), and then the character image generator 13 is notified of the designated expression or movement. The character image generator 13, receiving the notification, generates a character image according to the expression or movement designated at S3, based on the character image acquired at S2 (S4).

For example, in a case where the character image 13a shown in FIG. 6A is selected at S1, when the keys with the key numbers 3 and 4 are depressed in combination, the foregoing character image is subject to rendering according to the expression information of "mouth=CLOSE" and "right eye=CLOSE, left eye=CLOSE." In consequence, a character image 13b with the face having the mouth and both eyes closed, as shown in FIG. 6B, is generated.

Since the processes at and after S5 are conventionally well-known videotelephone techniques, the detailed description thereof will be omitted herein, but S5 is a step in which the image encoder 14 compresses and encodes the character image generated at S4. Similarly, S6 is a step in which the voice encoder 15 compresses and encodes the input originator's voice. The character image compressed and encoded at S5, together with the voice compressed and encoded at S6, is fed to the protocol processor 16 to be converted into a signal that can be received by the cell phone 20, using a predetermined videotelephone protocol (S7). Then the character image, together with the voice, is transmitted to the cell phone 20 being a correspondent of cell phone 10 (S8).

In the videotelephone system 1 according to the present invention, as described above, the cell phone 10 uses the character image acquired out of the plurality of character images to generate the character image with the designated expression or movement, and transmits it to the correspondent cell phone 20. This permits the user of the cell phone 10 being the originator, to display the character image reflecting his or her emotion or will, on the cell phone 20 side. Accordingly, the seasoning effect can be enhanced in a telephone conversation between the originator and recipient, by the relatively simple cell phone configuration without need for the voice analysis function and image analysis function.

The videotelephone system 1 is provided for synchronous reproduction of changing the expression or movement of the character image in quick response to instructions from the user and simultaneously transmitting the character image and voice. For this reason, different from the storage type reproduction technology using e-mail or the like, it has the advantage as follows. Namely, the originator can make the character image instantly reflect his or her emotion or will in the conversation with the recipient. Accordingly, it is feasible to implement smooth communication between the originator and the recipient, while maintaining real timeness of communication.

Second Embodiment

Next, the second embodiment of the present invention will be described.

The first embodiment described the example in which the user of cell phone 10 designated the expression or movement of the character image, whereas the present embodiment will describe an example in which an after-described tone analyzer determines the expression or movement of the character image, based on a result of an analysis of a tone of the user's voice entered. The tone herein refers to a sound volume or a level of sound (frequency), and, normally, the tone differs depending upon emotions of a man making voice, and varies with time according to changes of emotions. Therefore, by changing the expressions or movements of the character image on the basis of the tone, it is also feasible to achieve improvement in the seasoning effect, which is the object of the present invention.

First, the entire configuration of the videotelephone system in the second embodiment is much the same as that described with reference to FIG. 1, and thus the detailed description and illustration thereof will be omitted herein. Namely, the videotelephone system 2 in the present embodiment comprises cell phones 30, 40, base stations B1, B2, and a network N. The cell phone 30 can perform communication with the cell phone 40 sequentially through base station B1, network N, and base station B2.

Figure 7:
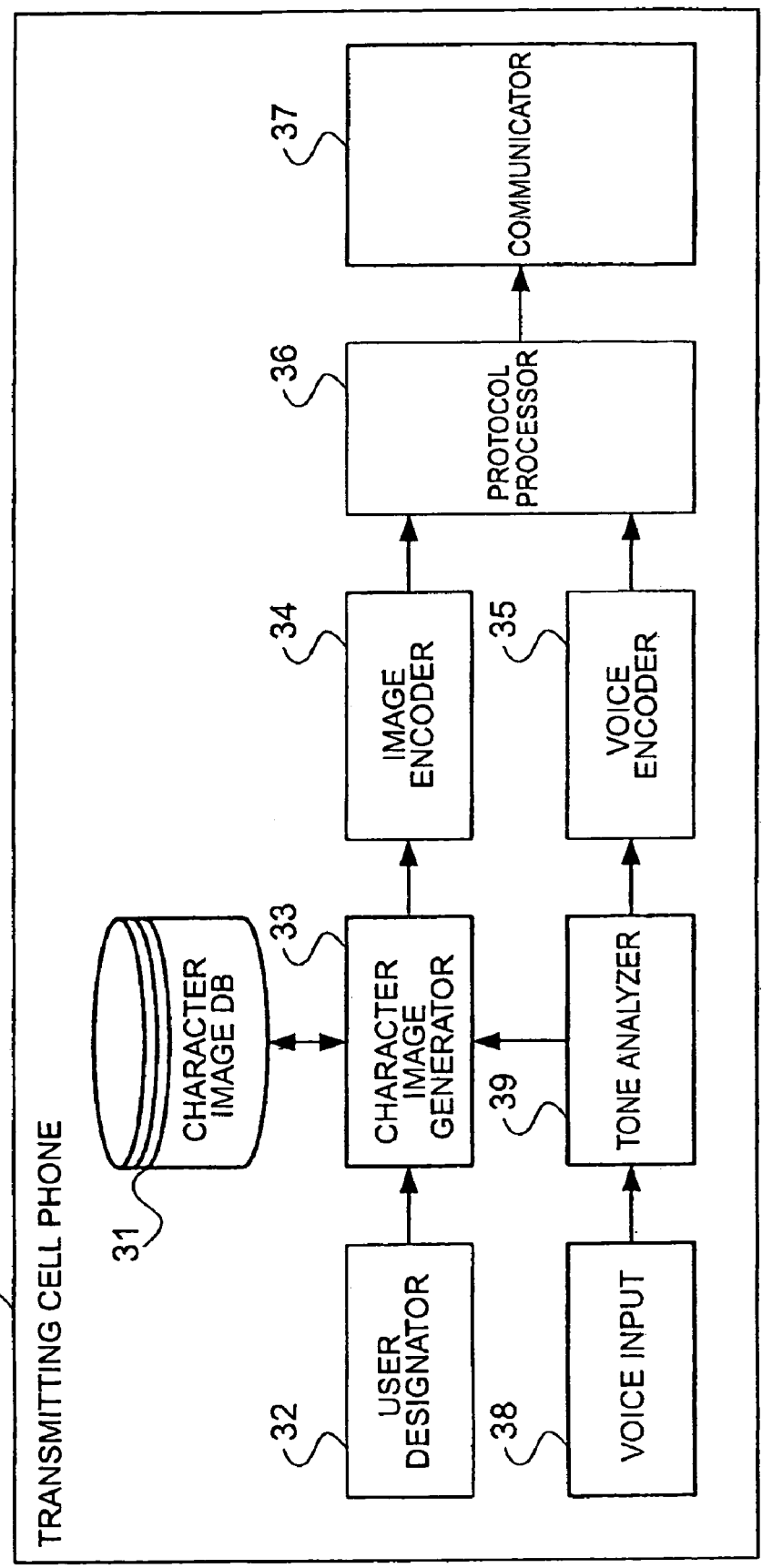
FIG. 7 is an illustration showing a functional configuration of a transmitting cell phone in the second embodiment.

Next, the functional configuration of cell phone 30 will be described with reference to FIG. 7. As shown in FIG. 7, the cell phone 30 is functionally composed of a character image DB 31 (corresponding to the storage means), a user designator 32, a character image generator 33 (corresponding to the generating means), an image encoder 34, a voice encoder 35, a protocol processor 36, a communicator 37 (corresponding to the transmitting means), a voice input part 38 (corresponding to the input means), and a tone analyzer 39 (corresponding to the determining means). As described, the cell phone 30 has a plurality of components common to the cell phone 10 in the first embodiment. Therefore, such components will be denoted by the same series of reference symbols (with the same last digits) to clarify the correspondence, without detailed description thereof, and peculiar components corresponding to differences between the first and second embodiments will be described below in detail.

The voice input part 38 collects the voice emitted by the user of the cell phone 30, converts it into an electric signal, and outputs the signal as a voice signal to the tone analyzer 39. The function of the voice input part 38 is substantialized by the audio processor 10g (cf. FIG. 3) as a physical component.

The tone analyzer 39 analyzes the tone of the voice signal fed from the voice input part 38, and determines an expression or movement of the character image on the basis of the result of the analysis. The character image generator 33 is notified of the expression or movement thus determined. There are a variety of conceivable techniques for the tone analyzer 39 to make the character image reflect the tone analysis result. The detailed processing contents will be described later in the description of operation, but, for example, the tone analyzer 39 simply determines the expression or movement of the character image, based on the presence or absence of input of voice. Namely, where the sound volume is greater than 0, i.e., where there is a voice input, it is estimated that the originator is talking, and the mouth of the character image is moved; conversely, where the sound volume is 0 or extremely small, i.e., where it can be determined that there is no voice input, it is estimated that the originator keeps quiet, and the mouth of the character image is closed.

The tone analyzer 39 may also be configured as follows: a threshold is set as to a change amount of sound volume and the expression or movement of the character image is determined based on whether the change amount exceeds the threshold. For example, where a difference between sound volumes measured at plural points of time exceeds a threshold and where the sound volumes vary from low to high, it can be presumed that the originator becomes irate, and thus the expression of the character image is determined to be an angry expression.

Furthermore, the tone analyzer 39 may also be configured to preliminarily retain tone patterns corresponding to a plurality of emotions and to make the expression or movement of the character image reflect an emotion corresponding to a tone pattern most similar to the tone analysis result. An effective means for determining similarity between the tone analysis result and tone pattern is to extract a characteristic quantity from the tone analysis result. For example, where a characteristic quantity extracted from the tone analysis result is most similar to a characteristic quantity of a tone pattern of laughing voice, the tone analyzer 39 determines a laughing face as an expression of the character image; where the characteristic quantity from the tone analysis result is most similar to a characteristic quantity of a tone pattern of crying voice, the tone analyzer 39 determines a crying face as an expression of the character image.

The tone analyzer 39 may also be configured as follows: a threshold is set as to a frequency of voice and the expression or movement of the character image is determined, based on whether the frequency exceeds the threshold. For example, where a frequency measured at an arbitrary point of time exceeds the threshold, i.e., where the voice is high, it is determined that the originator gets excited, and the expression of the character image is determined to be an excited expression. In contrast to it, where the measured frequency is not more than the threshold, i.e., where the voice is low, the expression of the character image is determined to be a depressed expression.

Figure 8:
FIG. 8 is an illustration showing an example of data storage in a table referred to when the transmitting cell phone in the second embodiment determines an expression of a character image.

Furthermore, the tone analyzer 39 can also be configured to determine the expression of the character image by combination of the sound volume with frequency. In this form, the tone analyzer 39 is preferably configured to have a reference table 391 as shown in FIG. 8. As shown in FIG. 8, the reference table 391 contains a plurality of expressions set for respective levels of sound volume (five levels) and for respective levels of frequency (five levels). According to the reference table 391, even if the frequency level is the highest "5," where the sound volume is 1 or 2, the character image is determined to have a laughing expression; where the sound volume is 3-5, the character image is determined to have an angry expression. Furthermore, degrees of gravity are set among angry expressions of the same kind; for example, fury for the sound volume of "5"; ordinary angry and a touch of angry for the sound volumes of "4" and "3," respectively; and so on. It is also possible to determine expressions corresponding to different levels of emotions similarly for the expressions except for "angry," e.g., "laugh," "be surprised," "dislike," "cry," and "sorrow."

The tone of voice differs in individual talkers. It is thus effective to arrange the tone analyzer 39 to store the tone of the originator at an ordinary time and continually update the tone every origination by the originator. Where the emotion of the originator is determined on the basis of the learned tone in this way, it is feasible to make the expression or movement of the character image reflect the tone analysis result more accurately.

The character image generator 33 acquires the character image selected by the user designator 32, from the character image DB 31 and generates a character image with an expression or movement determined by the tone analyzer 39, on the basis of the acquired character image.

In the present embodiment as well, the input operation by the user of the cell phone 30 embraces not only the input by finger, but also the voice recognition, and the voice input using the word registration. Where the cell phone 30 has such voice input function, the expression or movement of the character image can be changed as timed not only with the voice of the user (originator) of cell phone 30, but also with voice of the user (recipient) of cell phone 40. For example, while the character image is snoozing on the screen of cell phone 40, the recipient emits a voice of "Look!," "Hey," or the like and, when the user designator 32 of cell phone 30 recognizes it, the character image performs a movement of surprisedly waking up. When the tone analyzer 39 determines that the recipient tone is anger or excitement, the character image displays a surprised expression. Furthermore, a variety of modifications can be contemplated; for example, the character image nods unless the tone analyzer 39 detects the recipient's voice for a fixed period.

Figure 9:
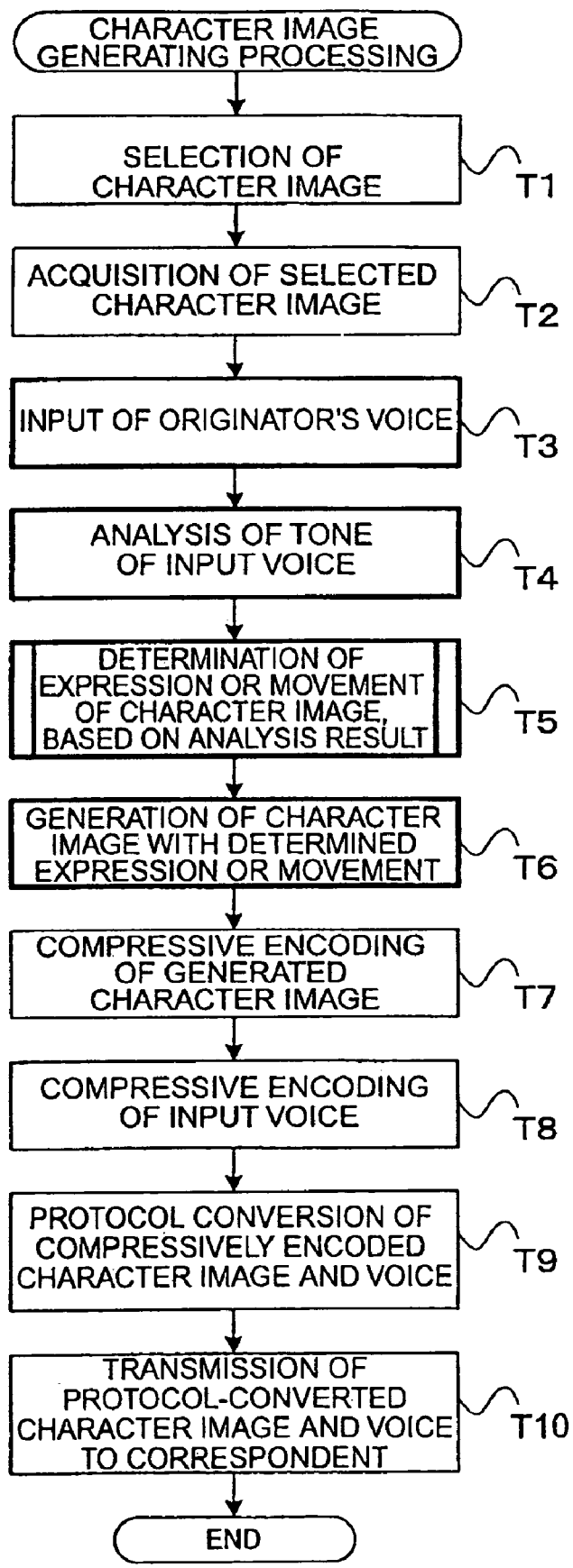
FIG. 9 is a flowchart for explaining a character image generating processing executed by the transmitting cell phone in the second embodiment.

Next, the operation of the videotelephone system in the second embodiment of the present invention will be described, while also describing each of steps in an image communication method according to the present invention. FIG. 9 is a flowchart for explaining the character image generating processing executed by the cell phone 30. The present character image generating processing includes a plurality of steps common to the character image generating processing in the first embodiment (cf. FIG. 5). Specifically, T1-T2 in FIG. 9 correspond to S1-S2 in FIG. 5, and likewise T7-T10 to S5-S8. T3-T6 (processes indicated in thick solid frames in FIG. 9), which are peculiar processes in the present embodiment, will be described below.

At T3, the voice input part 38 outputs a voice signal of a voice emitted by the user of cell phone 30, to the tone analyzer 39.

At T4, the tone analyzer 39 analyzes the tone of the voice signal fed at T3. The analysis result of the tone is temporarily retained in the tone analyzer 39.

At T5, the tone analyzer 39 determines an expression or movement of the character image, based on the tone analysis result at T4. Specifically, the tone analyzer 39 acquires sampling data with a predetermined time width from the tone analysis result. Preferably, the sampling data is acquired in batches of sampling data of the originator at normal time (hereinafter referred to as "reference sampling data") and sampling data as a target for determination of the expression or movement of the character image (hereinafter referred to as "target sampling data"). The tone analyzer 39 compares the target sampling data with the reference sampling data or a predetermined value, thereby predicting an emotion of the originator from a characteristic of the target sampling data (a level of sound volume or a level of frequency). The predicted emotion is reflected in the expression or movement of the character image to be transmitted to the cell phone 40.

Various forms can be contemplated about the processing of determining the expression or movement of the character image from the analysis result of the tone, and among, them four principal forms will be described below. The four forms are modes of determining the expression or movement of the character image, based on the presence/absence of voice, based on the level of sound volume, based on the level of frequency, and based on the level of sound volume and the level of frequency. For simplicity, the above forms will be referred to as a simple analysis mode, a volume analysis mode, a frequency analysis mode, and a composite analysis mode, respectively.

Figure 10:
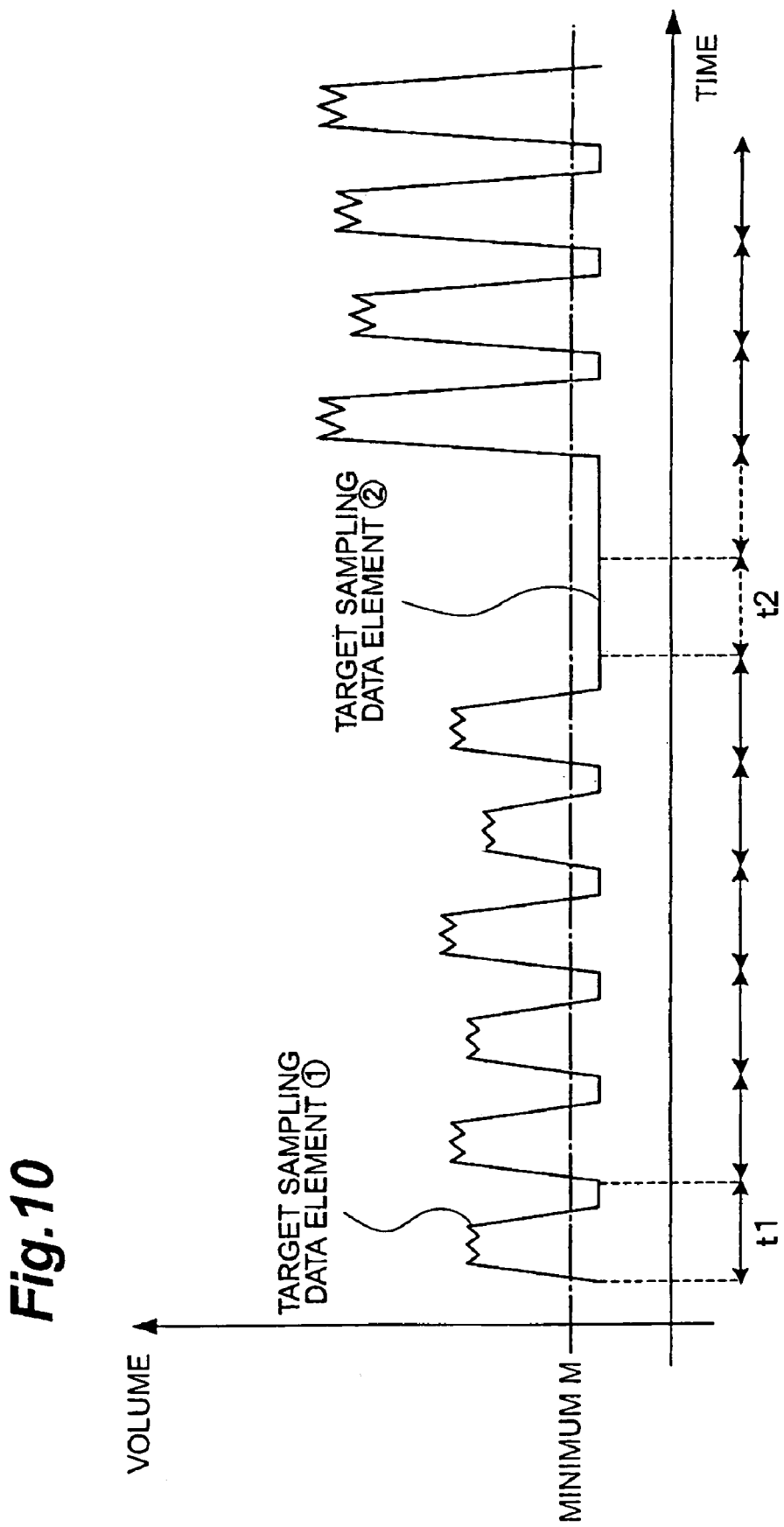
FIG. 10 is an illustration showing two types of target sampling data elements extracted from a tone analysis result, in selection of a simple analysis mode in the second embodiment.

First, a specific process of T5 in the simple analysis mode will be described with reference to FIGS. 10 and 11. FIG. 10 is an illustration showing the tone analysis result where the elapsed time is defined on the horizontal axis and the sound volume on the vertical axis. As shown in FIG. 10, the tone analysis result consists of a plurality of sampling data elements with a predetermined time width (e.g., about 3 seconds). In the present form, let us suppose a case of extracting a target sampling data element ① corresponding to a time width t1 and a case of extracting a target sampling data element ② corresponding to a time width t2.

Figure 11:
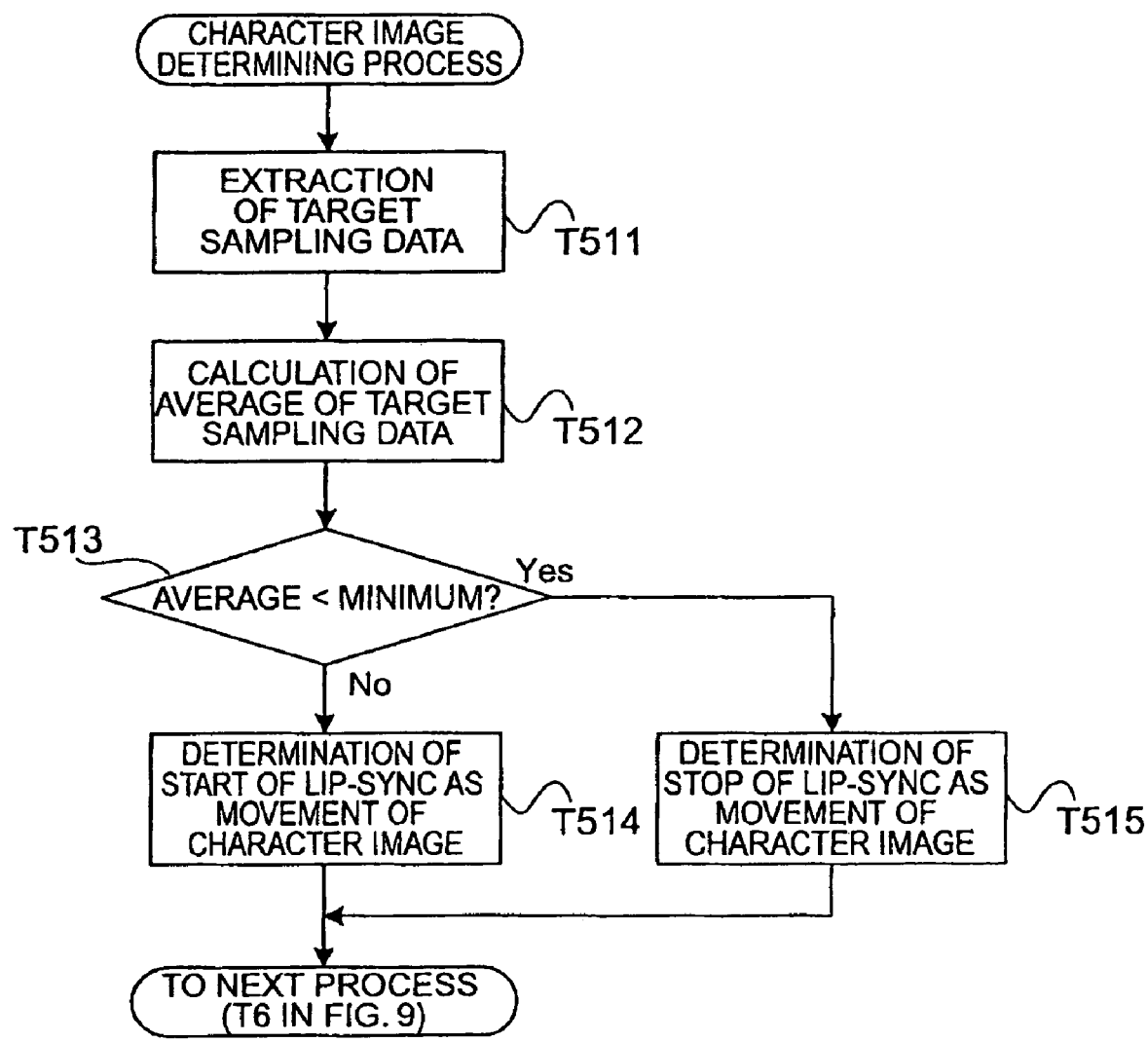
FIG. 11 is a flowchart for explaining a character image determining process executed in selection of the simple analysis mode in the second embodiment.

FIG. 11 is a flowchart for explaining the character image determining process executed in selection of the simple analysis mode. The tone analyzer 39 extracts a target sampling data element from the tone analysis result (T511) and thereafter calculates an average volume of the target sampling data element (T512). The average may be calculated for target sampling data except for abnormal values. The tone analyzer 39 preliminarily retains a value of sound volume in a silent state taking noise around the originator into consideration (a minimum) and, after the calculation of the average, it determines a magnitude relation between the average and the minimum (T513).

Returning here to FIG. 10, as to the target sampling data element ①, the average thereof is determined to be not less than the minimum M (T513 in FIG. 11; No) and, in this case, it is determined that the originator is emitting some voice. In order to match the character image with the originator's expression or movement, the tone analyzer 39 determines a start of opening and closing the mouth (lip-sync) as a movement of the character image acquired at T2 in FIG. 9 (T514) In contrast to it, as to the target sampling data element ②, the average thereof is determined to be less than the minimum M (T513 in FIG. 11; Yes). In this case, it is estimated that the originator is emitting no voice, and the tone analyzer 39 determines a stop of opening and closing the mouth (lip-sync) as a movement of the character image acquired at T2 (T515). Thereafter, the flow moves to the processes at and after T6 shown in FIG. 9.

Figure 12:
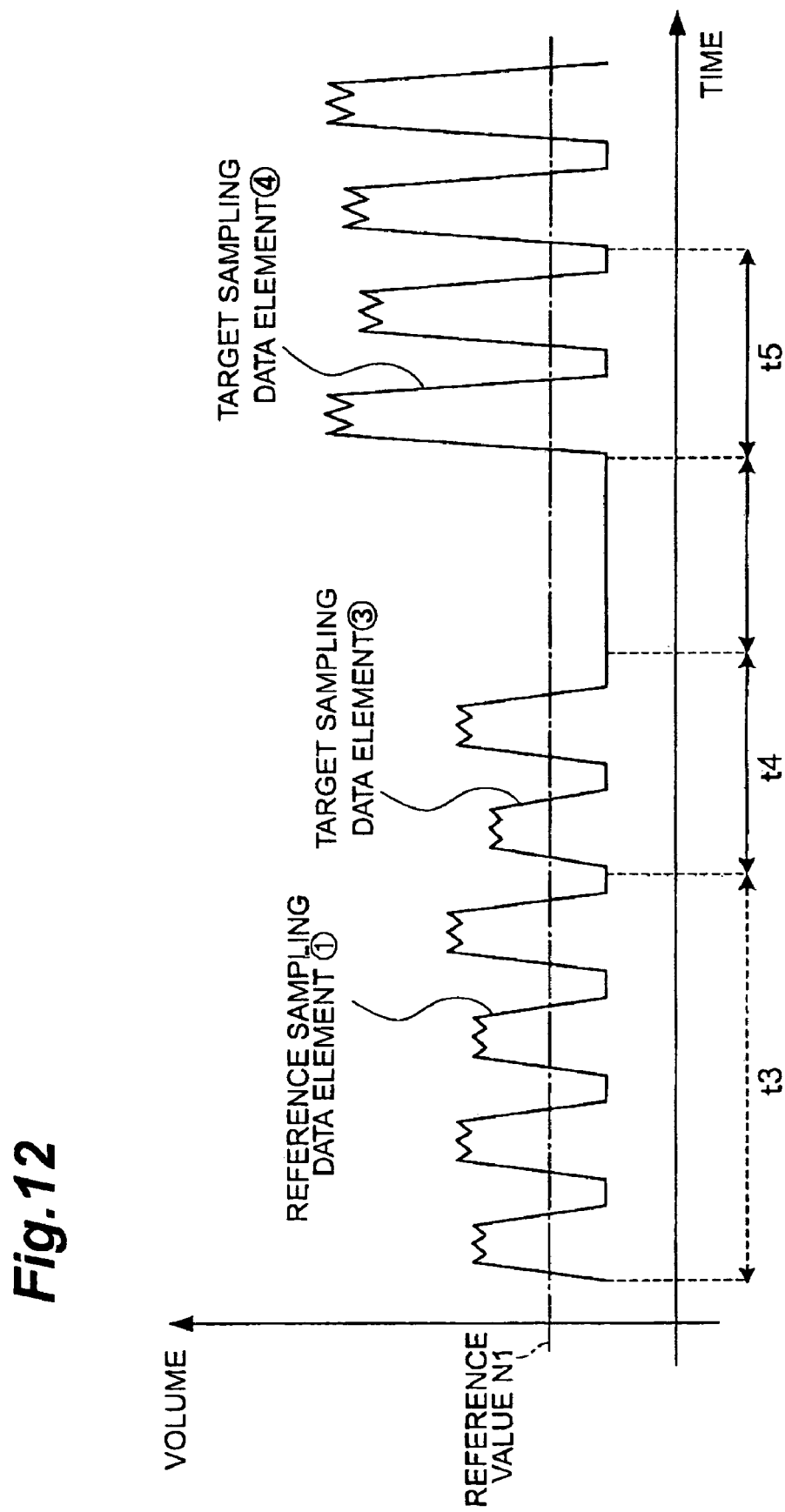
FIG. 12 is an illustration showing a reference sampling data element and two types of target sampling data elements extracted from a tone analysis result, in selection of a volume analysis mode in the second embodiment.

Subsequently, a specific process of T5 in the volume analysis mode will be described with reference to FIGS. 12 and 13. FIG. 12, similar to FIG. 10, is an illustration showing the tone analysis result where the elapsed time is defined on the horizontal axis and the sound volume on the vertical axis. As shown in FIG. 12, the tone analysis result contains a reference sampling data element ① with a time width t3 (e.g., about 10 seconds) and target sampling data elements ③, ④ with respective time widths t4, t5 (e.g., both about 5 seconds). These sampling data elements may have an identical time width.

Figure 13:
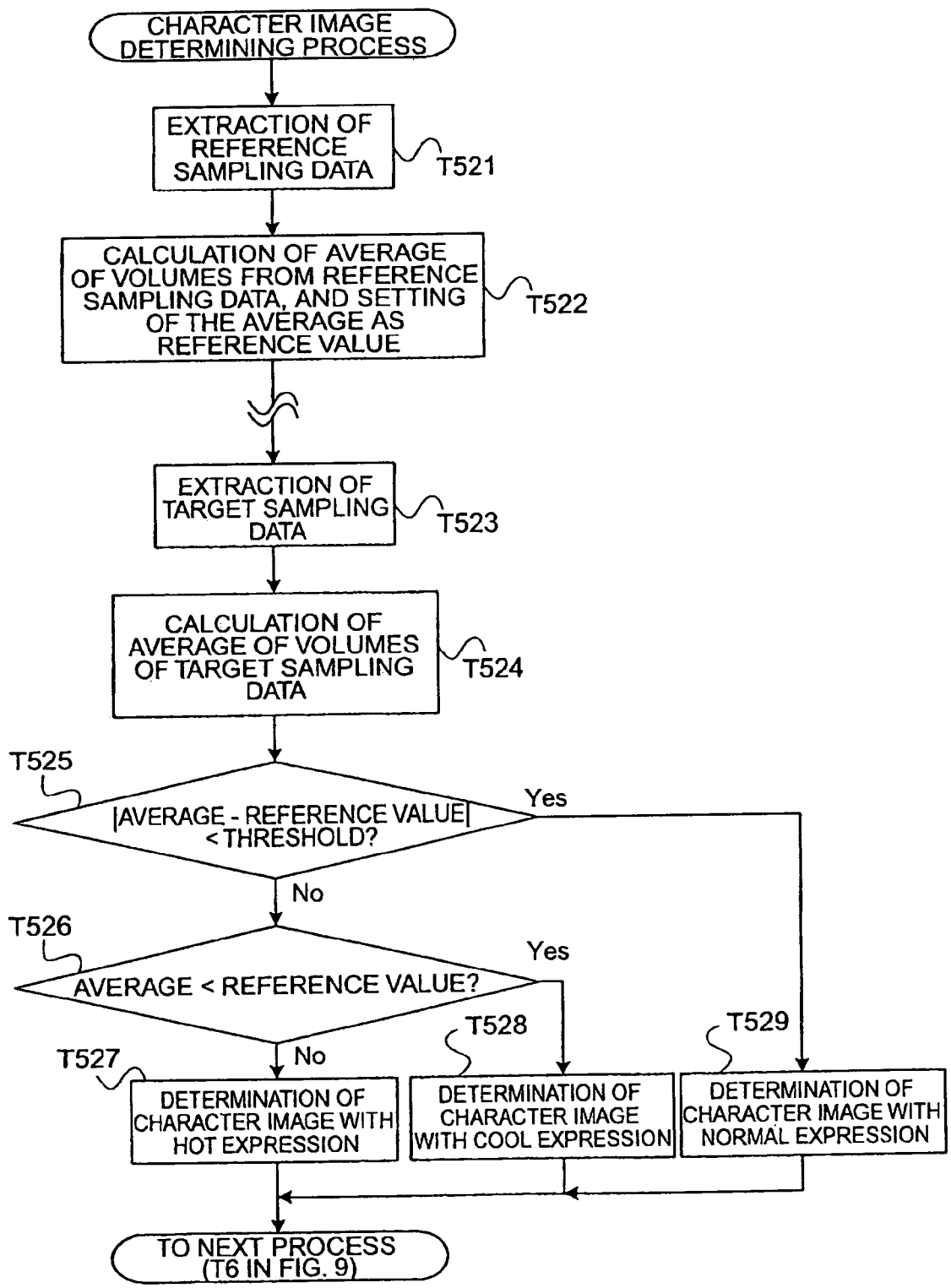
FIG. 13 is a flowchart for explaining a character image determining process executed in selection of the volume analysis mode in the second embodiment.

FIG. 13 is a flowchart for explaining the character image determining process executed in selection of the volume analysis mode. The tone analyzer 39 extracts a reference sampling data element from the tone analysis result (T521), and thereafter it calculates an average of sound volumes of this reference sampling data element and sets the average as a reference value (T522).

The tone analyzer 39 extracts a target sampling data element from the tone analysis result (T523) and thereafter calculates an average of sound volumes of the target sampling data element (T524). The average may also be calculated for target sampling data except for abnormal values. The tone analyzer 39 preliminarily retains a positive threshold as an index for determining whether the average deviates from the reference value, and, after the calculation of the average, it determines a magnitude relation between the above threshold and |average−reference value| being a difference between the average and the reference value (T525).

When the result of the determination is that the difference between the average and the reference value is not less than the threshold (T525; No), the tone analyzer 39 further determines a magnitude relation between the average and the reference value (T526). When the result of the determination is that the average is determined to be not less than the reference value (T526; No), the sound volume of the originator's voice deviates so as to be larger than that at normal time, and it is estimated that the originator has a hot feeling. Accordingly, the tone analyzer 39 determines a hot expression as an expression of the character image acquired at T2 in FIG. 9 (T527).

On the other hand, when the result of the determination at T526 is that the average is determined to be less than the reference value (T526; Yes), the volume of the originator's voice deviates so as to be smaller than that at normal time, and it is estimated that the originator has a cool feeling. Therefore, the tone analyzer 39 determines a cool expression as an expression of the character image acquired at T2 (T528).

Furthermore, when the result of the determination at T525 is that the difference between the average and the reference value is less than the threshold (T525; Yes), the volume of the originator's voice is close to that at normal time, and thus the tone analyzer 39 determines a normal expression as an expression of the character image acquired at T2 in FIG. 9 (T529). The character image generator 33 is notified of the expression determined by one of the processes at T527-T529. Thereafter, the flow goes to the processes at and after T6 in FIG. 9 to generate and transmit the character image with the aforementioned expression.

Returning to FIG. 12, for example, the average of sound volumes of the target sampling data element ③ is close to the reference value N1 being the average of sound volumes of the reference sampling data, and the difference between them does not exceed the threshold. Therefore, the character image with the normal expression is generated during the period in which the originator emits the voice corresponding to the target sampling data element ③ (t4). In contrast to it, the average of sound volumes of the target sampling data element ④ is considerably larger than the average (reference value N1) of sound volumes of the reference sampling data element, and the difference between them exceeds the threshold. Therefore, the character image with a hot expression is generated during the period in which the originator emits the voice corresponding to the target sampling data element ④ (t5)

The simple mode and the volume analysis mode are not always exclusively applied, but can also be applied in combination, of course. In this case, for example, where the average of sound volumes of a target sampling data element is greater than the minimum and is so greater than the reference value as to exceed the threshold, an image in which a character with a hot expression opens and closes its mouth is generated.

Figure 14:
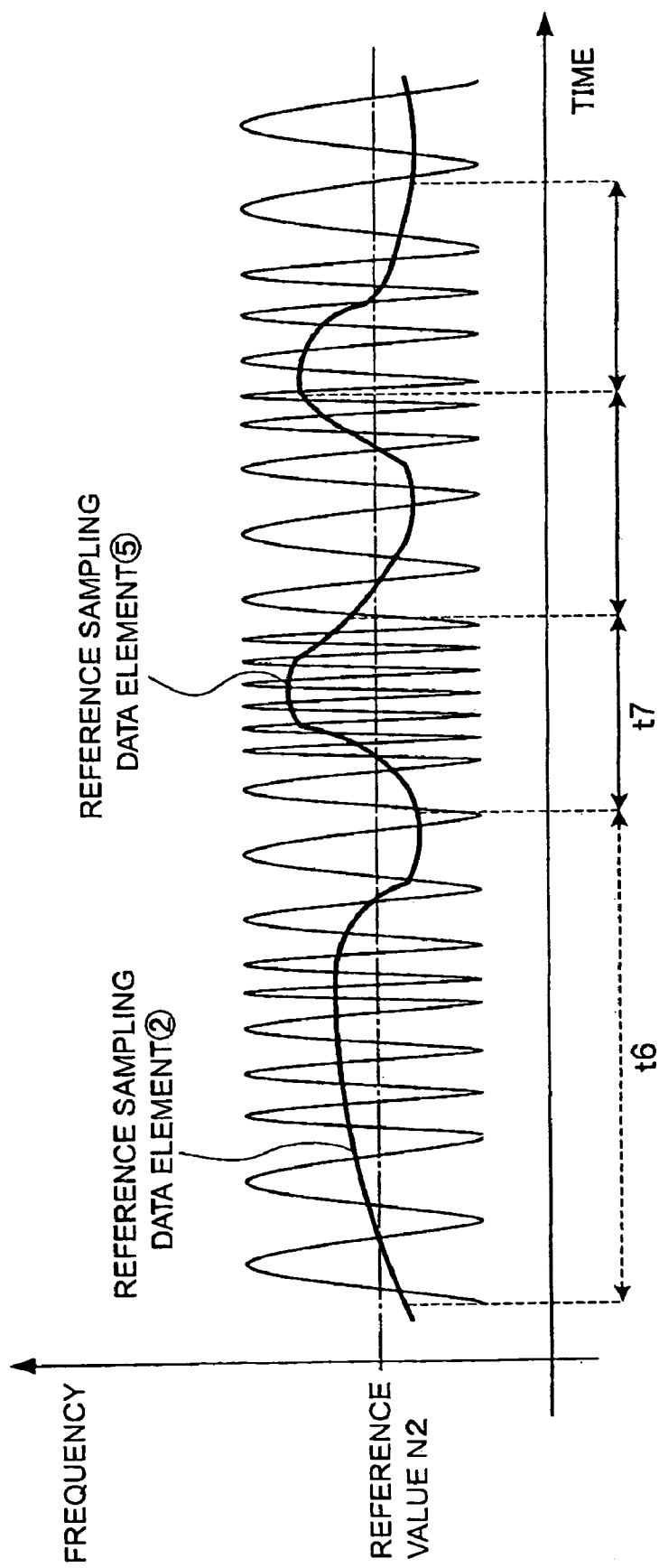
FIG. 14 is an illustration showing a reference sampling data element and a target sampling data element extracted from a tone analysis result, in selection of a frequency analysis mode in the second embodiment.

Next, a specific process of T5 in the frequency analysis mode will be described with reference to FIGS. 14 and 15. FIG. 14 is an illustration showing the tone analysis result where the elapsed time is defined on the horizontal axis and the frequency on the vertical axis, as in FIG. 12. As shown in FIG. 14, the tone analysis result contains a reference sampling data element ② with a time width t6 (e.g., about 10 seconds) and a target sampling data element ⑤ with a time width t7 (e.g., about 5 seconds). These sampling data elements may have an identical time width.

Figure 15:
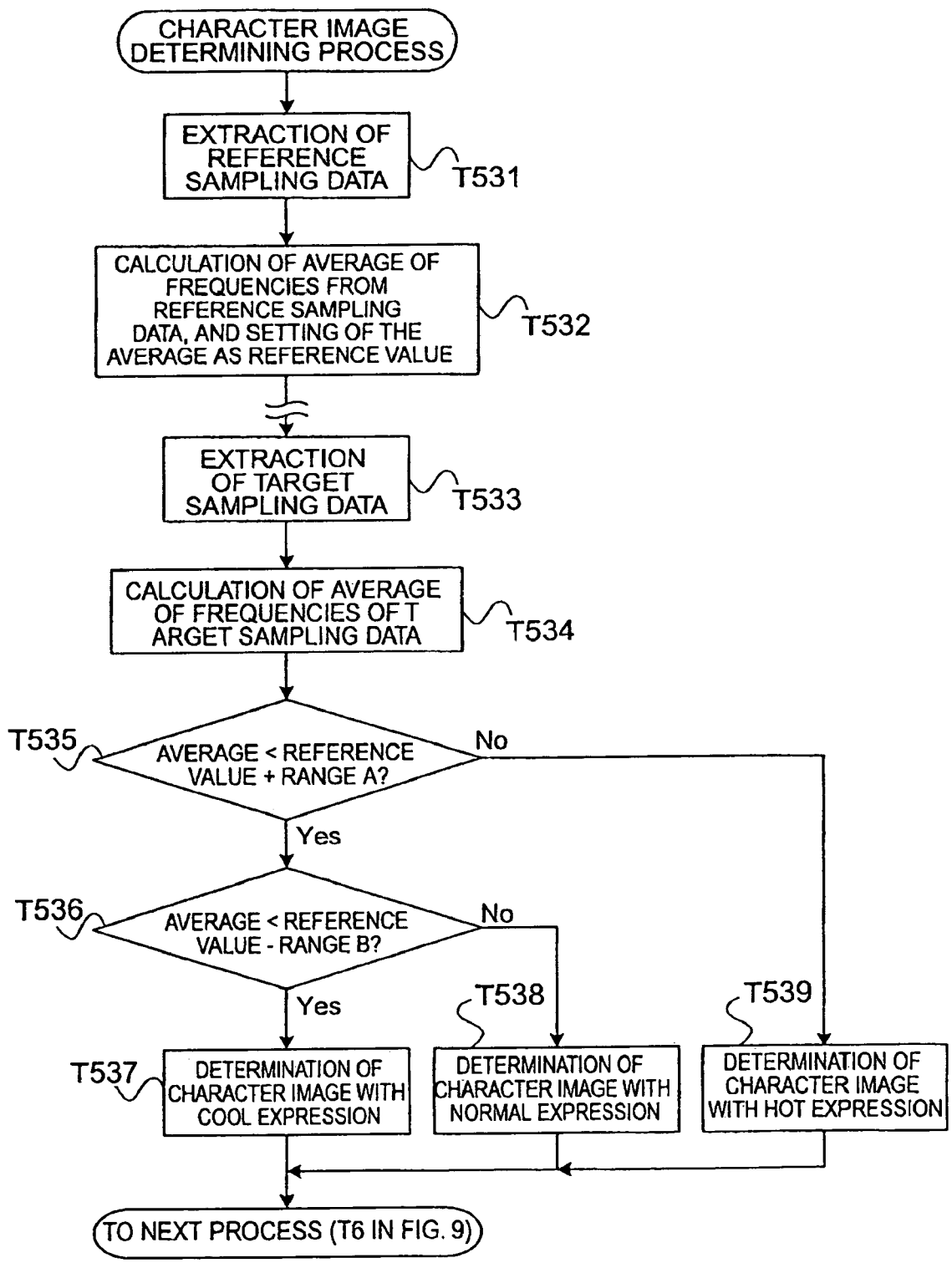
FIG. 15 is a flowchart for explaining a character image determining process executed in selection of the frequency analysis mode in the second embodiment.

FIG. 15 is a flowchart for explaining the character image determining process executed in selection of the frequency analysis mode. The tone analyzer 39 extracts the reference sampling data element from the tone analysis result (T531), and thereafter it calculates an average of frequencies of this reference sampling data element and sets the average as a reference value (T532).

The tone analyzer 39 extracts a target sampling data element from the tone analysis result (T533) and calculates an average of frequencies of the target sampling data element (T534) The average may also be calculated for target sampling data except for abnormal values. The tone analyzer 39 preliminarily retains positive ranges A, B as indices to indicate criteria for determining whether a frequency is different from that at normal time, depending upon how far the average deviates from the reference value. The ranges A, B may be an identical value or different values. After the calculation of the average, the tone analyzer 39 determines a magnitude relation between the average and the reference value+range A (T535).

When the result of the determination is that the average is less than the reference value+range A (T535; Yes), the tone analyzer 39 further determines a magnitude relation between the average and the reference value−range B (T536). When the result of the determination is that the average is less than the reference value−range B (T536; Yes), it is estimated that the frequency of the originator's voice is so low as to be said as different from that at normal time and that the originator has a cool feeling. Accordingly, the tone analyzer 39 determines a cool expression as an expression of the character image acquired at T2 in FIG. 9 (T537).

On the other hand, when the result of the determination at T536 is that the average is not less than the reference value−range B (T536; No), the frequency of the originator's voice is not so low as to be different from that at normal time, and is not so high as to be different from that at normal time from the result of the determination at T535. Namely, since the originator's voice is in a state close to that at normal time, it is estimated that the originator has a normal feeling. Accordingly, the tone analyzer 39 determines a normal expression as an expression of the character image acquired at T2 in FIG. 9 (T538).

Furthermore, when the result of the determination at T535 is that the average is not less than the reference value+range A (T535; No), the frequency of the originator's voice is so high as to be different from that at normal time, and it is estimated that the originator has a hot feeling. Therefore, the tone analyzer 39 determines a hot expression as an expression of the character image acquired at T2 (T539). The character image generator 33 is notified of the expression determined by one of the processes at T537-T539. Thereafter, the flow goes to the processes at and after TG shown in FIG. 9, to generate and transmit the character image with the aforementioned expression.

A more specific example will be described with numerals; for example, in a case where the reference value is set at 220 Hz from the reference sampling data and where the ranges A, B retained by the tone analyzer 39 are +25 Hz and +20 Hz, respectively, the reference value+range A is 245 Hz (=220+25) and the reference value−range B 200Hz (=220−20). Accordingly, the expression of the character image is determined using these values as thresholds for determining the level of the average of frequencies. Namely, where the average of frequencies of a target sampling data element is 150 Hz, because 150<200, the expression of the character image is determined to be one indicating a cool feeling; likewise, where the average is 210 Hz, because 200<210<245, the expression of the character image is determined to be one indicating a normal feeling. Where the average is 250 Hz, because 245<250, the expression of the character image is determined to be one indicating a hot feeling.

Next, a specific process of T5 in the composite analysis mode will be described with reference to FIGS. 16 to 18. FIG. 16 is an illustration showing the tone analysis result where the elapsed time is defined on the horizontal axis and the frequency on the vertical axis as in FIG. 14. As shown in FIG. 16, the tone analysis result contains a reference sampling data element ③ with a time width t8 (e.g., about 10 seconds) and a target sampling data element 6 with a time width t9 (e.g., about 5 seconds). The sampling data elements may have an identical time width.

Where the tone analysis result contains both the analysis result of sound volume and the analysis result of frequency as in this form, the tone analyzer 39 can determine the character image, using reference and target sampling data elements acquired from each of the tone analysis results. An example of processing of determining the character image by combination of the above sampling data elements will be described below.

The tone analyzer 39 in the present form has an emotion type table 392 referred to for determining a type of emotion, and an expression table 393 referred to for determining an expression. In the emotion type table 392, each of volume and frequency is set to have ranges of three levels. Namely, three ranges of less than reference value−threshold, not less than reference value−threshold but less than reference value+threshold, and not less than reference value+threshold are set for volume, and three ranges of less than reference value−range D, not less than reference value−range D but less than reference value+range C, and not less than reference value+range C are set for frequency. Once the volume and frequency are determined, a type of emotion is uniquely determined. For example, where the volume is within the range of not less than the reference value−threshold but less than the reference value+threshold, and where the frequency exceeds the reference value+range C, an intermediate hot emotion II is selected out of hot emotions. Where the volume is less than the reference value−threshold and where the frequency is less than the reference value−range D, the coolest emotion I is selected out of cool emotions.

The tone analyzer 39 determines the expression of the character image through the determined emotion type. For this purpose, it refers to the expression table 393. In the expression table 393, expressions of the character image are stored corresponding to types of emotions. The emotion types I, II, and III indicate levels of emotion in descending order. Normally, expressions of a man are correlated with emotions of the man, and thus the express ions are determined so as to match the correlations; for example, in the case of the emotion type being cool emotion I, a quite tired expression is set; in the case of the emotion type being hot emotion II, an impatient expression is set.

Returning to FIG. 9, the character image generator 33 is notified of the expression or movement determined at T5. At T6, the character image generator 33 receives the notification and generates a character image according to the expression or movement determined at T5, based on the character image acquired at T2.

As described above, the videotelephone system 2 in the second embodiment is so configured that the cell phone 30 analyzes the tone of the voice of the originator being the user thereof and determines the expression or movement of the character image on the basis of the result of the analysis. The expression or movement thus determined is reflected in the character image acquired from the character image DB 31, and the character image, together with the input voice, is transmitted to the cell phone 40. Accordingly, by the relatively simple configuration necessitating no image analysis processing, it is feasible to display the character image close to originator's desire on the recipient's cell phone. In consequence, the seasoning effect is enhanced in the telephone conversation between the originator and the recipient.

It is noted that the contents of the description in each of the above embodiments are a preferred example of the portable terminal according to the present invention and the present invention is by no means intended to be limited to this. For example, each of the above embodiments showed the case where the character image was displayed only on the correspondent cell phone 20, 40 except for the case where the pointer was displayed on the screen of the cell phone 10, 30, but the character image may also be displayed on the display screen of the originator's cell phone. Furthermore, where the recipient's cell phone 20, 40 has the same character image generating function as the originator's cell phone 10, 30 does, the cell phone may be provided with an additional function of combining the partner character image displayed on the screen, with a character image of its own.

Furthermore, a mode switching function may be added to the cell phone 10, 30. Specifically, when the originator turns a CCD (Charge-Coupled Device) camera toward the originator side (this side), the normal videotelephone function (a mode of photographing and transmitting the face image of the originator) becomes active, and when the originator turns the CCD camera to the opposite side of the originator, the function of generating the character image according to the present invention becomes active.

In addition, an image synthesizing function may be added to the cell phone 10, 30. Specifically, the cell phone is provided with such additional functions as superimposing the aforementioned character image on another moving picture or still image, combining the character image with a frame, and enabling designation of a synthetic range.

A letter adding function may also be added to the cell phone 10, 30. Specifically, the cell phone is provided with such additional functions as superimposing letters on the character image, adding a letter frame, pictographic letters, or a formatted report, and enabling designation of a size or color. In the case of pictographic letters, a sound corresponding thereto is generated.

A sound effect adding function may also be added to the cell phone 10, 30. Specifically, the cell phone is provided with such additional functions as mixing the input originator's voice with another sound effect, giving a scream to the partner, for example, with a depression of the 9-key, and giving a ringing melody as a BGM, e.g., with a depression of the #-key.

It is also a matter of course that one cell phone can have some or all of the plural functions owned by the cell phones 10, 20 in the first embodiment and the cell phones 30, 40 in the second embodiment. The portable terminals do not have to be limited to the cell phones, but may be PDAs (Personal Digital Assistances), personal computers, and so on. Furthermore, the portable terminals may also be terminals without the communication function and, in this case, the terminals can implement communication through an expansion device such as a cradle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A transmitting portable terminal comprising:
   storage means for storing a plurality of character images;
   input means for entering a user's voice;
   determining means for analyzing a tone of the user's voice entered by the input means, the determining means configured to determine an expression or a movement of a character image to be transmitted for receipt by a receiving portable terminal, based on a result of the analysis of the tone and a recipient user's voice received from the receiving portable terminal;

generating means for acquiring the character image out of the plurality of character images stored in the storage means, the generating means configured to generate the character image with the expression or the movement determined by the determining means;

transmitting means for transmitting the character image generated by the generating means, and the user's voice entered by the input means, to the receiving portable terminal; and wherein the determining means is further configured to analyze the tone to determine the expression or the movement according to a plurality of modes, wherein the plurality of modes comprise a simple mode based on a presence and an absence of voice, a volume mode based on a level of sound volume of the user's voice, a frequency mode based on a level of frequency of the user's voice, and a composite mode based on a combination of the level of sound volume of the user's voice and the level of frequency of the user's voice.

2. The transmitting portable terminal of claim 1, wherein the determining means is further configured to determine the expression or the movement using voice recognition to identify a word included in a word registration in association with a designated expression or a designated movement.

3. The transmitting portable terminal of claim 1, wherein the determining means is further configured to analyze the tone to determine the expression or the movement based on an expression table including at least two ranges for a frequency of the user's voice and at least two ranges for a volume of the user's voice.

4. The transmitting portable terminal of claim 1, wherein the generating means is further configured to dynamically alter a visual characteristic of the generated character image according to a season, a month, or a time of day.

5. The transmitting portable terminal of claim 1, further comprising a display screen configured to simultaneously display a recipient character image received from the receiving portable terminal and the generated character image.

6. A transmitting portable terminal comprising:
an input device configured to receive a user's voice;
a processor coupled with the input device;
a voice encoder executable with the processor to generate an encoded voice from the user's voice;
a character image database coupled with the processor and configured to store a plurality of character images;
a user designator executable with the processor to extract a character image from the plurality of character images and to designate an expression or a movement to apply to the character image;
a character image generator executable with the processor to generate the extracted character image and apply the designated expression or the designated movement thereto;
an image encoder executable with the processor to compress and encode the generated character image into a compressed image;
a protocol processor executable with the processor to convert the compressed and encoded generated character image into an image signal, and to convert the encoded voice into a voice signal using a protocol;
a radio communicator coupled with the processor, the radio communicator configured to transmit the image signal and the voice signal for receipt by a receiving portable terminal; and a tone analyzer executable with the processor to analyze the user's voice and determine the expression or the movement, wherein the tone analyzer is executable with the processor to perform a composite analysis comprising detection of a volume level of the user's voice and detection of a frequency level of the user's voice.

7. The transmitting portable terminal of claim 6, wherein the tone analyzer is executable with the processor to perform a simple analysis comprising detection of a presence or an absence of voice in order to selectively apply a mouth movement to the extracted character image as the designated expression or the designated movement.

8. The transmitting portable terminal of claim 6, wherein the tone analyzer is executable with the processor to determine the expression or the movement according to composite analysis based on an expression table including at least two ranges for the frequency level of the user's voice and at least two ranges for the volume level of the user's voice.

9. The transmitting portable terminal of claim 6, wherein the plurality of character images in the character image database are indexed in the character image database according to a characteristic, the characteristic comprising at least one of a background, a gender, an age, a hairstyle, and clothes.

10. The transmitting portable terminal of claim 6, wherein the character image generator is further executable with the processor to automatically provide the expression or the movement comprising an eye blink or a delicate facial movement.

11. A transmitting portable terminal comprising:
a memory configured to store a plurality of character images;
a microphone configured to receive a user's voice;
a processor in communication with the memory and the microphone, the processor configured to analyze a tone of the user's voice received by the microphone, the processor further configured to determine an expression or a movement of a character image to be transmitted for receipt by a receiving portable terminal, based on a result of the analysis of the tone and a recipient user's voice received from the receiving portable terminal;
a character image generator configured to acquire the character image out of the plurality of character images stored in the memory, the character image generator further configured to generate the character image with the expression or the movement determined by the processor;
a transceiver in communication with the processor, the transceiver configured to transmit the character image generated by the character image generator, and the user's voice received by the microphone, to the receiving portable terminal; and
wherein the processor is further configured to analyze the tone of the user's voice to determine the expression or the movement of the character image according to a plurality of modes, wherein the plurality of modes comprise a simple mode based on a presence and an absence of voice, a volume mode based on a level of sound volume of the user's voice, a frequency mode based on a level of frequency of the user's voice, and a composite mode based on a combination of the level of sound volume of the user's voice and the level of frequency of the user's voice.

12. The transmitting portable terminal of claim 11, wherein the processor is further configured to determine the expression or the movement using voice recognition to identify a word included in a word registration in association with a designated expression or a designated movement.

13. The transmitting portable terminal of claim 11, wherein the processor is further configured to analyze the tone to determine the expression or the movement based on an expression table including at least two ranges for a frequency of the user's voice and at least two ranges for a volume of the user's voice.

14. The transmitting portable terminal of claim 11, wherein the image generator is further configured to dynamically alter a visual characteristic of the generated character image according to a season, a month, or a time of day.

15. The transmitting portable terminal of claim 11, further comprising a display screen configured to simultaneously display a recipient character image received from the receiving portable terminal and the generated character image.

* * * * *

UNITED STATES PATENT AND TRADEMARK OFFICE
CERTIFICATE OF CORRECTION

PATENT NO.       : 7,486,969 B2
APPLICATION NO.  : 10/850098
DATED            : February 3, 2009
INVENTOR(S)      : Kazuya Anzawa et al.

It is certified that error appears in the above-identified patent and that said Letters Patent is hereby corrected as shown below:

<u>Title Page, item (56), Column 2, Foreign Patent Documents</u>

Delete "JP 02-215891  9/1991" and insert --JP 03-215891  9/1991--

Signed and Sealed this

Twenty-eighth Day of April, 2009

JOHN DOLL
*Acting Director of the United States Patent and Trademark Office*